US009253364B2

(12) United States Patent
Yoshida et al.

(10) Patent No.: US 9,253,364 B2
(45) Date of Patent: Feb. 2, 2016

(54) DISPLAY APPARATUS, DISPLAY METHOD, AND COMPUTER PROGRAM PRODUCT

(71) Applicants: Hiroyuki Yoshida, Tokyo (JP);
Ryonosuke Miyazaki, Tokyo (JP);
Tomoyoshi Takeuchi, Tokyo (JP);
Yasushi Yamaguchi, Tokyo (JP)

(72) Inventors: Hiroyuki Yoshida, Tokyo (JP);
Ryonosuke Miyazaki, Tokyo (JP);
Tomoyoshi Takeuchi, Tokyo (JP);
Yasushi Yamaguchi, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/069,558

(22) Filed: Nov. 1, 2013

(65) Prior Publication Data

US 2014/0126006 A1    May 8, 2014

(30) Foreign Application Priority Data

Nov. 8, 2012  (JP) ................................. 2012-245974
Aug. 27, 2013  (JP) ................................. 2013-175934

(51) Int. Cl.
*G06T 5/00*    (2006.01)
*H04N 1/407*    (2006.01)
*G03F 3/10*    (2006.01)
*H04N 1/387*    (2006.01)
*G06T 15/04*    (2011.01)
(Continued)

(52) U.S. Cl.
CPC .............. *H04N 1/387* (2013.01); *G06F 3/1208* (2013.01); *G06F 3/1256* (2013.01); *G06F 3/1285* (2013.01); *G06T 13/20* (2013.01); *G06T 15/04* (2013.01); *G06F 17/212* (2013.01); *G06T 3/0093* (2013.01); *G06T 15/00* (2013.01); *G06T 15/50* (2013.01); *H04N 1/6097* (2013.01)

(58) Field of Classification Search
CPC combination set(s) only.
See application file for complete search history.

(56) References Cited

U.S. PATENT DOCUMENTS 5,363,477 A * 11/1994 Kuragano ............... G06T 15/50
                                                                345/426
7,385,612 B1 * 6/2008 Peterson ............... G06T 3/0093
                                                                345/581
(Continued)

FOREIGN PATENT DOCUMENTS

JP   2004147064 A  *  5/2004
JP   2006-274521      10/2006
(Continued)

OTHER PUBLICATIONS

Kergosien et al, "Bending and Creasing Virtual Paper", IEEE Computer Graphics and Applications 1994.*
(Continued)

*Primary Examiner* — Richard Zhu
(74) *Attorney, Agent, or Firm* — Oblon, McClelland, Maier & Neustadt, L.L.P.

(57) ABSTRACT

A display apparatus that displays a preview of print data includes an input unit that receives input of a sheet handling method of a sheet on which the print data is printed from a user, a generating unit that dynamically generates a three-dimensional image representing a behavior, which is a continuous change in a form of the sheet on which the print data is printed, according to the input sheet handling method, and a display unit that displays, as a moving image, the three-dimensional image that is dynamically generated.

8 Claims, 18 Drawing Sheets

(51) Int. Cl.
*G06F 3/12* (2006.01)
*G06T 13/20* (2011.01)
*G06T 15/50* (2011.01)
*H04N 1/60* (2006.01)
*G06F 17/21* (2006.01)
*G06T 3/00* (2006.01)
*G06T 15/00* (2011.01)

(56) References Cited

U.S. PATENT DOCUMENTS 8,724,169 B2 * 5/2014 Itami ............................ 358/1.9
2005/0275879 A1 * 12/2005 Ogasawara ................. 358/1.15
2010/0026711 A1 * 2/2010 Muramoto .................... 345/619
2010/0214598 A1 * 8/2010 Hoppenot et al. ........... 358/1.15
2012/0313926 A1 * 12/2012 Rolleston et al. ............. 345/419

FOREIGN PATENT DOCUMENTS

JP 2009-223875 10/2009
JP 2011-140135 7/2011
JP 2013-219694 10/2013

OTHER PUBLICATIONS

Rohmer et al, "Folded Paper Geometry from 2D pattern and 3D contour", Eurographics 2011.*
Solomon et al, "Flexible Developable Surfaces", Eurographics Symposium on Geometry Processing 2012.*
JPO Machine Translation of JP2004-147064A.*

* cited by examiner

FIG.2
HARDNESS TABLE
| SHEET TYPE | HARDNESS PARAMETER (0 TO 1.0) |
|---|---|
| MIRROR COATED PAPER | 0.9 |
| GLOSS COATED PAPER | 0.6 |
| MATTE COATED PAPER | 0.6 |
| PLAIN PAPER | 0.5 |
| ... | ... |
FIG.3
(a) RETURNING FORM
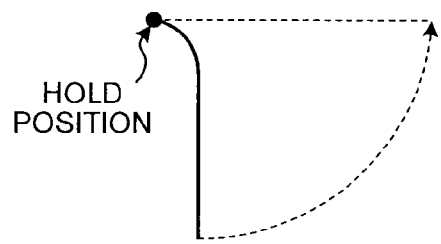
HOLD POSITION
(b) BENDING FORM
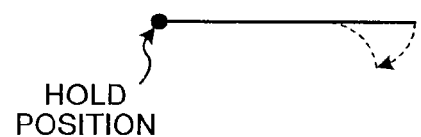
HOLD POSITION

LIFT UP

BACKWARD TURN

FORWARD TURN

SNAP

BENDING LOAD TABLE

| FORCE F APPLIED TO SHEET | ANGLE CORRECTION VALE K |
|---|---|
| STRONG | $+\theta f$ |
| MODERATE | 0 |
| WEAK | $-\theta w$ |

CORRECT DISTORTION
DUE TO TEXTURE
MAPPING

DISPLAY APPARATUS, DISPLAY METHOD, AND COMPUTER PROGRAM PRODUCT

CROSS-REFERENCE TO RELATED APPLICATIONS

The present application claims priority to and incorporates by reference the entire contents of Japanese Patent Application No. 2012-245974 filed in Japan on Nov. 8, 2012 and Japanese Patent Application No. 2013-175934 filed in Japan on Aug. 27, 2013.

BACKGROUND OF THE INVENTION

1. Field of the Invention

The present invention relates to a display apparatus, a display method, and a computer program product.

2. Description of the Related Art

A printing system that displays a preview image for estimating a print result before actual printing has been known. With the display of the preview image, a user can confirm the print result before printing, so that misprints can be prevented. As for a technology for displaying a preview image, for example, Japanese Patent Application Laid-open No. 2011-140135 discloses a technology for displaying, as a preview, a three-dimensional image that represents how a sheet used for printing bends depending on a sheet type.

However, in the technology disclosed in Japanese Patent Application Laid-open No. 2011-140135, the way that the sheet used for printing bends is represented in only a discontinuous manner, and a behavior of the sheet when the sheet is handled in a general manner is not represented. Therefore, it is difficult to accurately represent the reality of the sheet in a preview display.

In view of the above circumstances, there is needed to provide a display apparatus, a display method, and a computer program product capable of displaying a preview that accurately represents the reality of the sheet.

SUMMARY OF THE INVENTION

It is an object of the present invention to at least partially solve the problems in the conventional technology.

According to the present invention, there is provided: a display apparatus that displays a preview of print data, the display apparatus comprising: an input unit configured to receive input of a sheet handling method of a sheet on which the print data is printed from a user; a generating unit configured to dynamically generate a three-dimensional image representing a behavior, which is a continuous change in a form of the sheet on which the print data is printed, according to the input sheet handling method; and a display unit configured to display, as a moving image, the three-dimensional image that is dynamically generated.

The present invention also provides a display method implemented by a display apparatus that displays a preview of print data, the display method comprising: receiving input of a sheet handling method of a sheet on which the print data is printed from a user; generating, in a dynamic manner, a three-dimensional image representing a behavior, which is a continuous change in a form of the sheet on which the print data is printed, according to the input sheet handling method; and displaying, as a moving image, the three-dimensional image that is dynamically generated.

The present invention also provides a computer program product comprising a non-transitory computer-usable medium having computer-readable program codes embodied in the medium, the program codes when executed causing a computer that displays a preview of print data to execute: receiving input of a sheet handling method of a sheet on which the print data is printed from a user; generating, in a dynamic manner, a three-dimensional image representing a behavior, which is a continuous change in a form of the sheet on which the print data is printed, according to the input sheet handling method; and displaying, as a moving image, the three-dimensional image that is dynamically generated.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a diagram illustrating an example of a hardness table;

FIGS. 3(a) and 3(b) are diagrams for explaining a difference between a returning form and a bending form;

DETAILED DESCRIPTION OF THE PREFERRED EMBODIMENTS

Exemplary embodiments of a display apparatus, a display method, and a computer program product according to the present invention will be explained in detail below with reference to the accompanying drawings.

The display apparatus according to the embodiment is connected to a printing apparatus serving as an image forming apparatus via a network, and displays, as a preview, a three-dimensional image (3D image) of print data to be printed by the printing apparatus to confirm a print result before printing. Examples of the display apparatus include, but not limited to, a normal computer such as a personal computer (PC).

Figure 1:
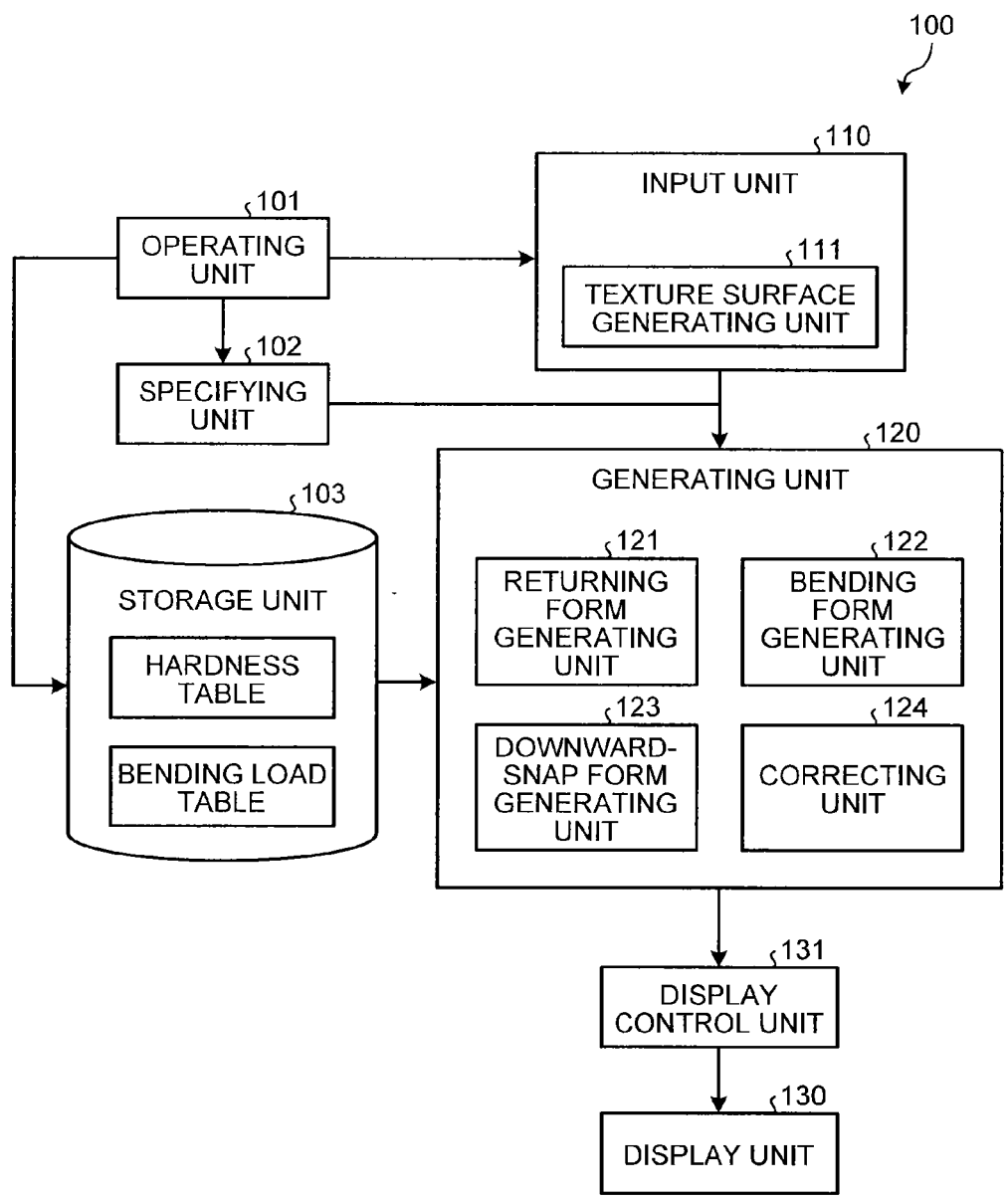
FIG. 1 is a block diagram illustrating a functional configuration of a display apparatus according to an embodiment.

FIG. 1 is a block diagram illustrating a functional configuration of the display apparatus according to the embodiment. As illustrated in FIG. 1, a display apparatus 100 according to the embodiment mainly includes an operating unit 101, an input unit 110, a specifying unit 102, a storage unit 103, a generating unit 120, a display control unit 131, and a display unit 130.

The operating unit 101 is an input device, such as a keyboard or a mouse. In the embodiment, the operating unit 101 receives, from a user, input of at least a sheet handling method of a sheet on which print data is to be printed and a sheet type used for printing. Incidentally, the sheet handling method is specified based on a sheet hold position and sheet operation to be performed on the sheet. Namely, the user inputs the sheet hold position and the sheet operation as information for designating the sheet handling method, by using the operating unit 101.

The sheet hold position is a position on the sheet, at which the user holds the sheet with hand. In the embodiment, the sheet hold position is "left", "right", "top", or "bottom" of the sheet. The operating unit 101 receives, as the hold position, input of any of the positions "left", "right", "top", and "bottom" of the sheet.

The sheet operation is a type of the operation performed on the sheet while the user is holding the sheet at the hold position as described above. In the embodiment, the operation includes "lift up" for lifting the sheet up, "forward turn" for turning the sheet in a forward direction being a direction toward the user, "backward turn" for turning the sheet in a backward direction being a direction opposite to the user, and "snap" for lifting the sheet up and then snapping the sheet downward with a snap of the wrist. The operating unit 101 receives, as the operation, input of designation of any of "lift up", "forward turn", "backward turn", and "snap".

The sheet type includes a mirror coated paper, a gloss coated paper, a matte coated paper, a plain paper, and the like. The operating unit 101 receives input of any of the above sheet types. Incidentally, the sheet types are described by way of example only and not limited to the above examples.

Furthermore, the operating unit 101 may receive, from the user, a light source setting indicating the level of the intensity of a light source, designation of print data to be printed, an instruction to shutdown the apparatus, or the like.

The operating unit 101 receives input of the above information by causing the display control unit 131 to display a selection screen for selecting items, such as the hold position, the operation, and the sheet type, on the display unit 130, and allowing the user to select items displayed on the selection screen by using the operating unit 101.

The input unit 110 loads the print data received by the operating unit 101 to a random access memory (RAM) or the like, and converts the data to preview display data in a data format that can be handled by the display apparatus 100. Specifically, the input unit 110 converts the print data to the preview display data, such as image data or data in the portable document format (PDF). Furthermore, the input unit 110 includes a texture surface generating unit 111 that adds texture corresponding to the sheet type to the preview display data.

For example, the texture surface generating unit 111 reads an illumination conversion parameter or a light reflection intensity parameter corresponding to the sheet type input via the operating unit 101 from the storage unit 103 (to be described later), generates texture information based on the illumination conversion parameter or the reflection intensity parameter that is read as above, and adds the texture information to the preview display data.

The storage unit 103 is a storage medium, such as a hard disk drive device (HDD) or a flash memory. The storage unit 103 stores therein a hardness table containing the sheet type and a hardness parameter in an associated manner. FIG. 2 is a diagram illustrating an example of the hardness table. As illustrated in FIG. 2, the hardness parameter is registered in the hardness table in association with the sheet type such as a mirror coated paper, a gloss coated paper, a matte coated paper, and a plain paper.

Meanwhile, the hardness parameter is a parameter indicating the hardness of a sheet according to the sheet type, and is a value ranging from 0 to 1. It is indicated that the sheet becomes harder and difficult to bend as the hardness parameter approaches 1. For example, in FIG. 2, the hardness parameter of "0.9" is associated with the mirror coated paper that does not bend easily, and the hardness parameter of "0.6" is associated with the gloss coated paper and the matte coated paper that bend easily.

The storage unit 103 also stores therein the illumination conversion parameter, the light reflection intensity parameter such as specular reflection, diffuse reflection, or environment reflection, and grayscale data that is information to be a basis of α channel pattern data for representing surface roughness according to the sheet type, in association with the sheet type. A user is allowed to arbitrarily change the setting of the hardness table, the illumination conversion parameter, the light reflection intensity parameter, and the grayscale data by viewing a preview image displayed on the display unit 130.

The storage unit 103 also stores therein a bending load table containing the magnitude of a force applied to the sheet due to "forward turn", "backward turn", or "snap" and a correction value of a bending angle, in an associated manner. A specific example of the bending load table will be described in detail later.

Referring back to FIG. 1, the display unit 130 is a display device, such as a display. The display control unit 131 controls display on the display unit 130. In the embodiment, the display control unit 131 includes a well-known 3D display engine, such as OpenGL, and displays display data of a 3D image, which is chronological representation of forms of curved surfaces of the sheet and which is dynamically generated by the generating unit 120 (to be described later), as a 3D image representing a behavior that is a continuous change in the form of the sheet, on a display position of the display unit 130 designated by the generating unit 120. Therefore, the display unit 130 displays, as a moving image (preview), the 3D image representing the behavior of the sheet on which the print data is printed, in accordance with the sheet handling method input by the user. If the 3D display engine receives, as arguments, a parameter indicating the intensity of the light source and a parameter indicating the reflection intensity of the light source, the 3D display engine can display simulation of reflection of light in the image data while taking a direction with respect to the light source into account.

The specifying unit 102 specifies a combination of sheet folding forms based on the sheet handling method (the hold position and the operation) input via the operating unit 101. More specifically, the specifying unit 102 specifies a combination of forms among a returning form, a bending form, a bouncing form, and a downward-snap form, as a combination of the folding forms corresponding to the sheet handling method. Meanwhile, each of the returning form, the bending form, the bouncing form, and the downward-snap form is a form that changes in a predetermined manner with time, and the generating unit 120 can generate a 3D image representing a change in each of the forms.

The returning form is a form obtained when the sheet is lifted up to rise (becomes a flat state) from a sagged state. The bending form is a form obtained when the sheet is bent in a forward direction or a backward direction by being pinched at the opposite side of the hold position.

FIGS. 3(*a*) and 3(*b*) are diagrams for explaining a difference between the returning form and the bending form. FIG. 3(*a*) illustrates a change in the form of the sheet in the returning form. FIG. 3(*b*) illustrates a change in the form of the sheet in the bending form. In the returning form, as illustrated in FIG. 3(*a*), the form of the sheet changes such that the sheet returns to a flat state from a state in which the sheet has been bent at a portion close to the hold position. In the bending form, as illustrated in FIG. 3(*b*), the form of the sheet changes such that the sheet is bent at a portion distant from the hold position from the flat state.

Meanwhile, the returning form may include a change in the form until the sheet sags down (until the sheet bends at a portion close to the sheet hold position). Furthermore, the bending form may include a change in the form from a state in which the sheet is bent at the portion distant from the sheet hold position to a state in which the sheet is returned to the flat state.

The bouncing form is a form, which is obtained when an end portion opposite the sheet hold position of the sheet that has returned to the flat state due to the returning form slightly bounces forward and in which the maximum bending angle of the bending form is reduced to a minute angle. In other words, the bouncing form is a part of the bending form after the returning form.

The downward-snap form is a form obtained when the end portion opposite the sheet hold position is snapped downward while the hold position is bowed after the state in which the end portion opposite the sheet hold position has bounced forward due to the bouncing form.

Figure 4:
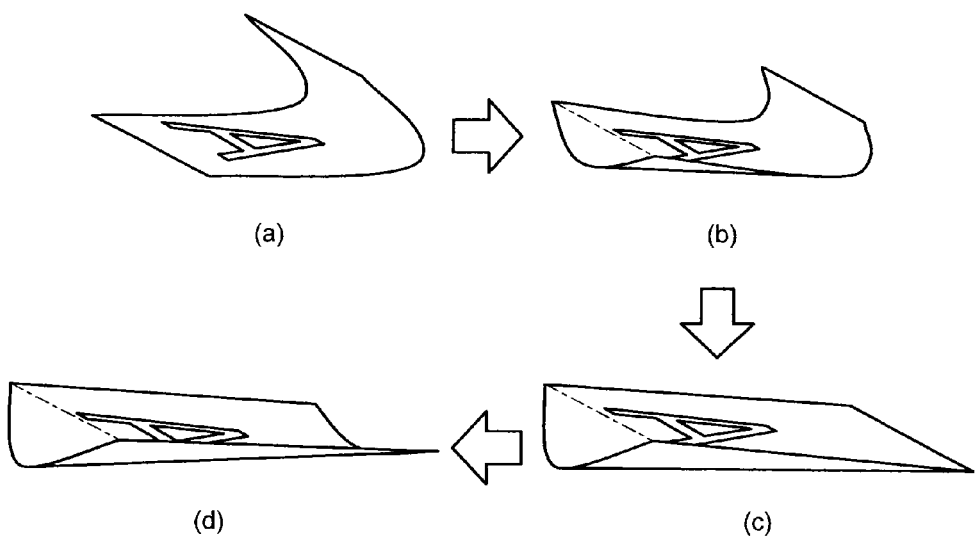
FIG. 4 is a diagram illustrating a form change in a downward-snap form.

FIG. 4 is a diagram illustrating a form change of the downward-snap form. In the downward-snap form, as illustrated in FIG. 4, the form of the sheet that has been in the bouncing form changes such that the end portion opposite the hold position extends while the hold position is bowed, and after the end portion opposite the hold position completely extends, the end portion is slightly bowed and sags down. More specifically, in the downward-snap form, if the hold position is "left", a right side of the sheet bounces at the maximum bending angle in the bouncing form (a figure (a) in FIG. 4), the right side of the sheet extends while the left side of the sheet is bowed as if the sheet is folded in a valley fold with the center of the left side used as a vertex (a figure (b) in FIG. 4). After the right side of the sheet completely extends (a figure (c) in FIG. 4), the right side of the sheet is slightly bowed and sags down as if the sheet is folded in a valley fold with the center of the right side used as a vertex (a figure (d) in FIG. 4).

As described above, with the operating unit 101, any of "top", "bottom", "left", and "right" is designated as the sheet hold position, and any of "lift up", "forward turn", "backward turn", and "snap" is designated as the operation performed on the sheet. The specifying unit 102 specifies a combination of some of the returning form, the bending form, the bouncing form, and the downward-snap form that can be generated by the generating unit 120, as a combination of forms for representing a behavior of the sheet according to the hold position and the operation (the sheet handling method) designated as described above.

Figure 5:
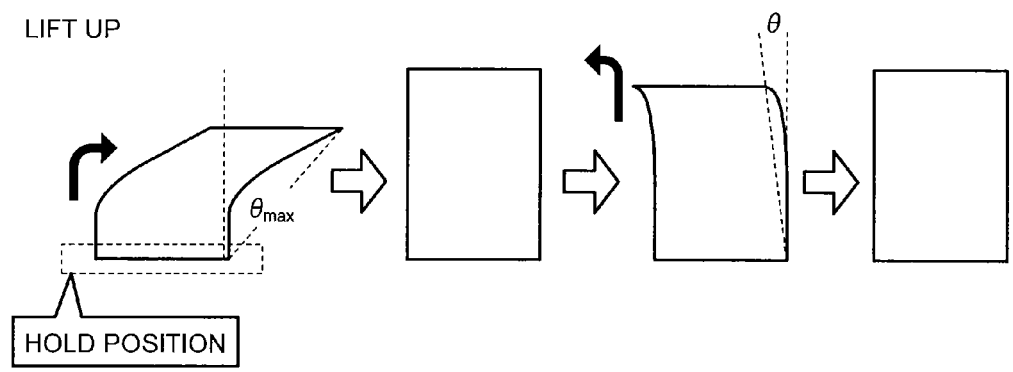
FIG. 5 is a diagram illustrating a behavior of the sheet when a hold position is "bottom" and operation is "lift up"

FIG. 5 is a diagram illustrating a behavior of the sheet when the hold position is "bottom" and the operation is "lift up". This example illustrates a behavior of the sheet when a user holds a bottom end portion of a vertically-long sheet on a desk with hand, and lifts up a top end portion opposite the hold position to the front of the eyes of the user. In the example illustrated in FIG. 5, the sheet behaves such that the sheet that has been bent in the backward direction at a portion close to the bottom end portion serving as the hold position becomes a flat state, and thereafter, a portion close to the top end portion bounces and returns to the flat state.

Figure 6:
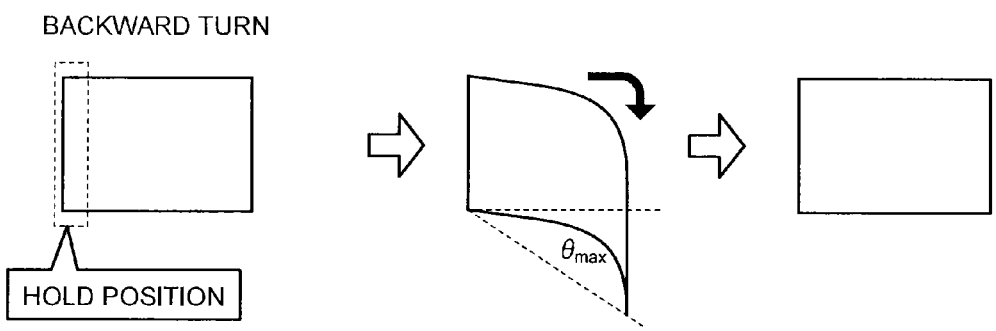
FIG. 6 is a diagram illustrating a behavior of the sheet when the hold position is "left" and the operation is "backward turn"

FIG. 6 is a diagram illustrating a behavior of the sheet when the hold position is "left" and the operation is "backward turn". This example illustrates a behavior of the sheet when the user holds a left end portion of a horizontally-long sheet with the left hand and bends the right side of the sheet in the backward direction with the right hand. In the example illustrated in FIG. 6, the sheet behaves such that the right side opposite the left end portion serving as the hold position bends in the backward direction and thereafter returns to the flat state.

Figure 7:
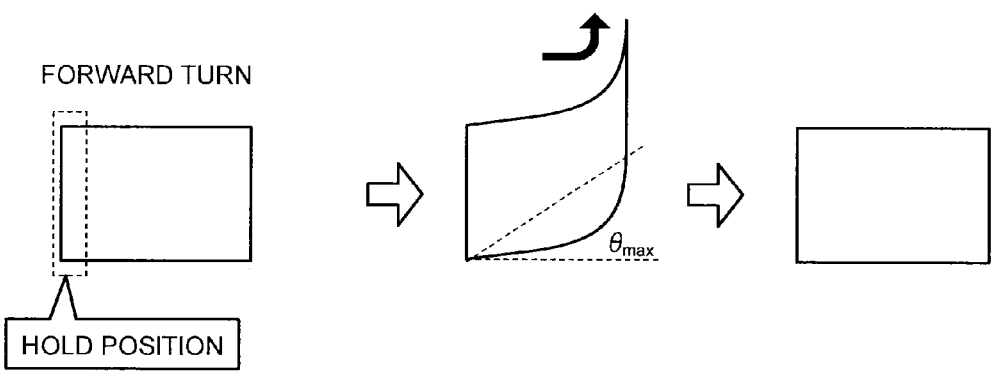
FIG. 7 is a diagram illustrating a behavior of the sheet when the hold position is "left" and the operation is "forward turn"

FIG. 7 is a diagram illustrating a behavior of the sheet when the hold position is "left" and the operation is "forward turn". This example illustrates a behavior of the sheet when the user holds a left end portion of a horizontally-long sheet with the left hand and bends the right side of the sheet in the forward direction with the right hand. In the example illustrated in FIG. 7, the sheet behaves such that the right side opposite the left end portion serving as the hold position bends in the forward direction and thereafter returns to the flat state. Meanwhile, in FIGS. 5 to 7, θmax represents a maximum value of a sheet folding angle θ (a maximum bending angle). Namely, as illustrated in FIGS. 5 to 7, the maximum bending angle θmax is a maximum value of the angle (the folding angle θ) between the position of the end portion opposite the hold position when the sheet is not bent and the position of the end portion opposite the hold position when the sheet is bent, on the assumption that the hold position serves as an origin.

Figure 8:
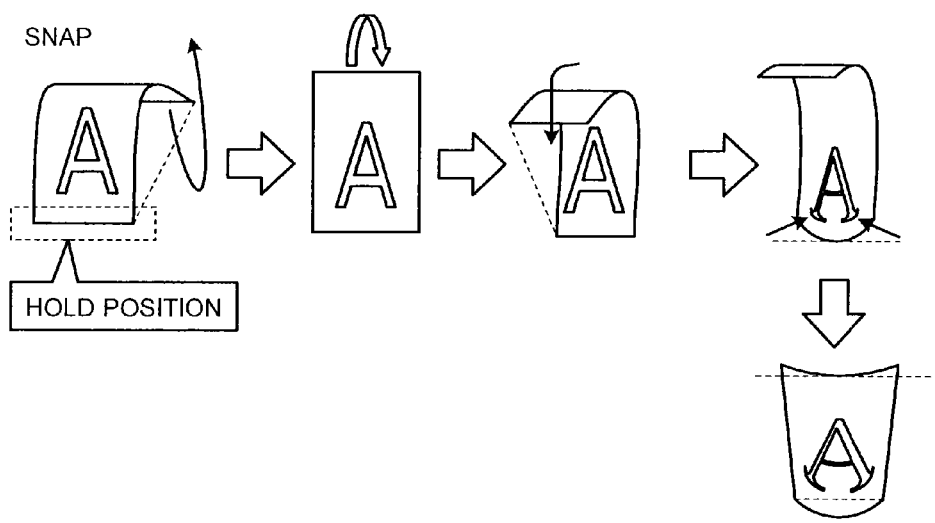
FIG. 8 is a diagram illustrating a behavior of the sheet when the hold position is "bottom" and the operation is "snap"

FIG. 8 is a diagram illustrating a behavior of the sheet when the hold position is "bottom" and the operation is "snap". This example illustrates a behavior of the sheet when the user holds a bottom end portion of a vertically-long sheet with hand, lifts up a top end portion opposite the hold position to the front of the eyes of the user, and then swiftly snaps the sheet downward with a snap of the wrist. In the example illustrated in FIG. 8, the sheet behaves such that a portion close to the top end portion bounces forward similarly to the behavior in "lift up" as illustrated in FIG. 5, the top end portion extends while the center of the bottom end portion is bowed, and after the top end portion completely extends, the center of the top end portion is slightly bowed and sags down.

As will be described below, the behavior of the sheet according to the sheet handling method (the hold position and the operation) as described above can be associated with the operation for the returning form, the bending form, the bouncing form, and the downward-snap form to be generated by the generating unit 120.

Figure 9:
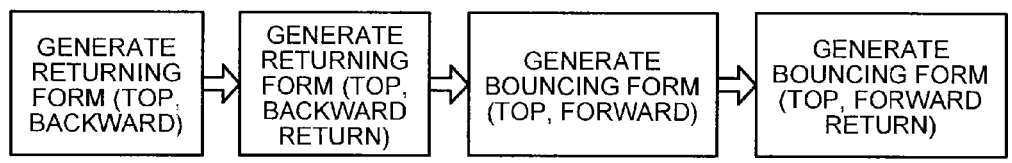
FIG. 9 is a diagram illustrating a combination of folding forms for representing a behavior of the sheet when the hold position is "bottom" and the operation is "lift up"

FIG. 9 is a diagram illustrating a combination of folding forms for representing the behavior of the sheet when the hold position is "bottom" and the operation is "lift up". As illustrated in FIG. 9, when "bottom" is designated as the hold position and "lift up" is designated as the operation, the specifying unit 102 specifies, as a combination of the folding forms for representing the sheet behavior, a combination of two returning forms and two bouncing forms, in particular, a combination of a returning form (top and backward), a returning form (top and backward return), a bouncing form (top and forward), and a bouncing form (top and forward return).

Figure 10:
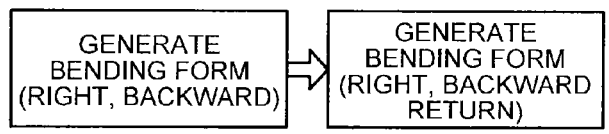
FIG. 10 is a diagram illustrating a combination of folding forms for representing a behavior of the sheet when the hold position is "left" and the operation is "backward turn"

FIG. 10 is a diagram illustrating a combination of folding forms for representing the behavior of the sheet when the hold position is "left" and the operation is "backward turn". As illustrated in FIG. 10, when "left" is designated as the hold position and "backward turn" is designated as the operation, the specifying unit 102 specifies, as a combination of the folding forms for representing the sheet behavior, a combination of two bending forms, in particular, a combination of a bending form (right and backward) and a bending form (right and backward return).

Figure 11:
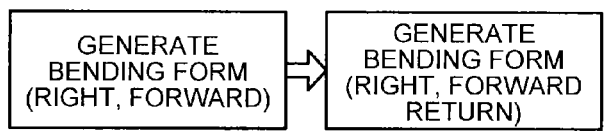
FIG. 11 is a diagram illustrating a combination of folding forms for representing a behavior of the sheet when the hold position is "left" and the operation is "forward turn"

FIG. 11 is a diagram illustrating a combination of folding forms for representing the behavior of the sheet when the hold position is "left" and the operation is "forward turn". As illustrated in FIG. 11, when "left" is designated as the hold position and "forward turn" is designated as the operation, the specifying unit 102 specifies, as a combination of the folding forms for representing the sheet behavior, a combination of two bending forms, in particular, a combination of a bending form (right and forward) and a bending form (right and forward return).

Figure 12:
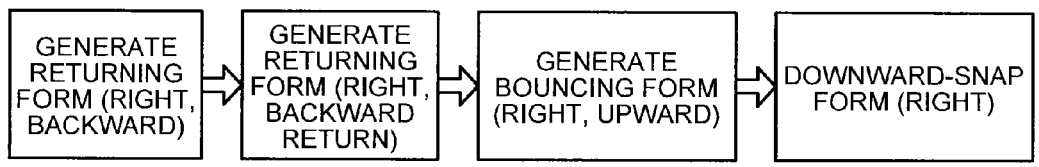
FIG. 12 is a diagram illustrating a combination of folding forms for representing a behavior of the sheet when the hold position is "left" and the operation is "snap"

FIG. 12 is a diagram illustrating a combination of folding forms for representing the behavior of the sheet when the hold position is "left" and the operation is "snap". As illustrated in FIG. 12, when "left" is designated as the hold position and "snap" is designated as the operation, the specifying unit 102 specifies, as a combination of the folding forms for representing the sheet behavior, a combination of two returning forms, one bouncing form, and one downward-snap form, in particular, a combination of a returning form (right and backward), a returning form (right and backward return), a bouncing form (right and upward), and a downward-snap form (right).

After specifying the combination of the folding forms for representing the sheet behavior according to the designated sheet handling method (the hold position and the operation) as described above, the specifying unit 102 instructs the generating unit 120 to generate the folding forms, for each of the folding forms of the specified combination. Specifically, when the generating unit 120 completes generation of one of the folding forms of the specified combination, the specifying unit 102 instructs the generating unit 120 to generate a next folding form of the combination.

Referring back to FIG. 1, the generating unit 120 sequentially generates the folding forms of the combination in accordance with the instruction by the specifying unit 102, to thereby dynamically generate a 3D image representing the behavior of the sheet according to the designated sheet handling method (the hold position and the operation). The generating unit 120 includes a returning form generating unit 121 that generates the returning form, a bending form generating unit 122 that generates the bending form, a downward-snap form generating unit 123 that generates the downward-snap form, and a correcting unit 124. Incidentally, the bouncing form is generated by the bending form generating unit 122 because the bouncing form is obtained by reducing the maximum bending angle θ of the bending form to a minute angle.

The returning form generating unit 121, the bending form generating unit 122, and the downward-snap form generating unit 123 of the generating unit 120 generate corresponding folding forms by, for example, a Bézier surface, and output Bézier control point arrays that define the generated Bézier surface. Specific examples of processes performed by the returning form generating unit 121, the bending form generating unit 122, and the downward-snap form generating unit 123 of the generating unit 120 will be described in detail later.

The generating unit 120 dynamically generates pieces of display data (Bézier control point arrays defining the Bézier surface and a texture image for mapping the print data to a three-dimensional space) that are chronological representation of forms of curved surfaces of the sheet on which the print data is printed, based on the folding forms generated by the returning form generating unit 121, the bending form generating unit 122, and the downward-snap form generating unit 123 according to the instruction by the specifying unit 102 and based on the preview display data converted by the input unit 110. Thereafter, the generating unit 120 sequentially sends the generated pieces of the display data to the display control unit 131. Therefore, the display unit 130 displays, as a preview in the form of a moving image such as animation, the 3D image representing a sheet behavior that occurs when the sheet, on which the print data is printed, is handled by a user by the method designated by the user.

Figure 13:
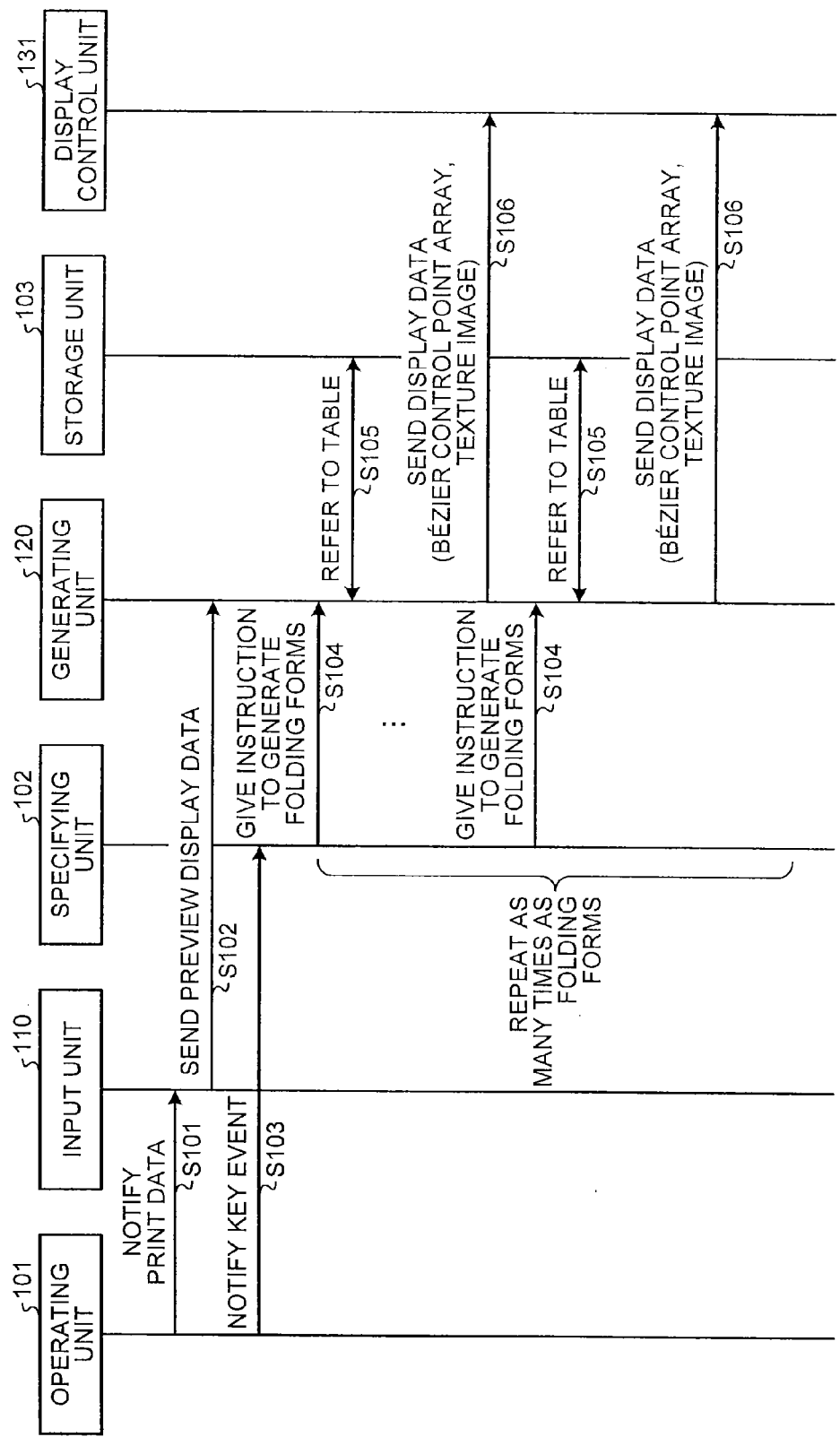
FIG. 13 is a sequence diagram illustrating overall operation performed by the display apparatus according to the embodiment.

FIG. 13 is a sequence diagram illustrating overall operation performed by the display apparatus according to the embodiment. The flow of a basic process performed by the display apparatus according to the embodiment will be described below with reference to FIG. 13.

The operating unit 101 receives designation of print data to be displayed as a preview from a user, and notifies the input unit 110 of the designation (Step S101). The input unit 110 loads a file (a PDF file or the like) of the designated print data into a random access memory (RAM) or the like, converts the print data into preview display data in a data format that can be handled by the display unit 130, and sends the preview display data to the generating unit 120 (Step S102).

Thereafter, the operating unit 101 receives a key event for selecting a sheet handling method (the hold position and the operation) from the user, and notifies the specifying unit 102 of the key event (Step S103). The specifying unit 102 specifies a combination of folding operations for representing a behavior of the sheet corresponding to the sheet handling method (the hold position and the operation) designated by the user, and instructs the generating unit 120 to generate folding forms for each of the folding forms of the specified combination (Step S104).

The generating unit 120 generates the folding forms (the returning form, the bending form, the bouncing form, or the downward-snap form) designated by the specifying unit 102 by referring to parameters in the table stored in the storage unit 103 (Steps S105), generates a texture image to be mapped, by texture mapping, to the folding forms based on the preview display data converted by the input unit 110, generates display data (Bézier control point arrays and a texture image) for forming a 3D image based on the above data, and sends the display data to the display control unit 131 (Step S106).

The generating unit 120 repeats the processes of Steps S105 and S106 every time the specifying unit 102 issues an instruction to generate a folding form, so that the display data that is chronological representation of forms of the curved surfaces of the sheet on which the print data is printed is dynamically generated and sent to the display control unit 131. Therefore, the display unit 130 displays the 3D image representing the behavior of the sheet corresponding to the sheet handling method (the hold position and the operation) designated by the user, as a preview in the form of a moving image such as animation.

Figure 14:
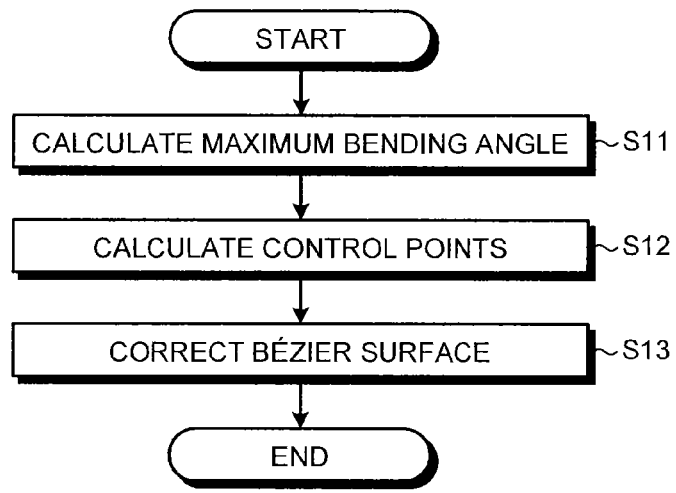
FIG. 14 is a flowchart illustrating the flow of a folding form generation process performed by a generating unit.

The process performed by the generating unit 120 will be described in detail below. FIG. 14 is a flowchart illustrating the flow of a folding form generation process performed by the generating unit 120.

As illustrated in FIG. 14, each of the returning form generating unit 121, the bending form generating unit 122, and the downward-snap form generating unit 123 of the generating unit 120 calculates a maximum bending angle of the sheet based on each of the folding forms (Step S11).

Figure 15:
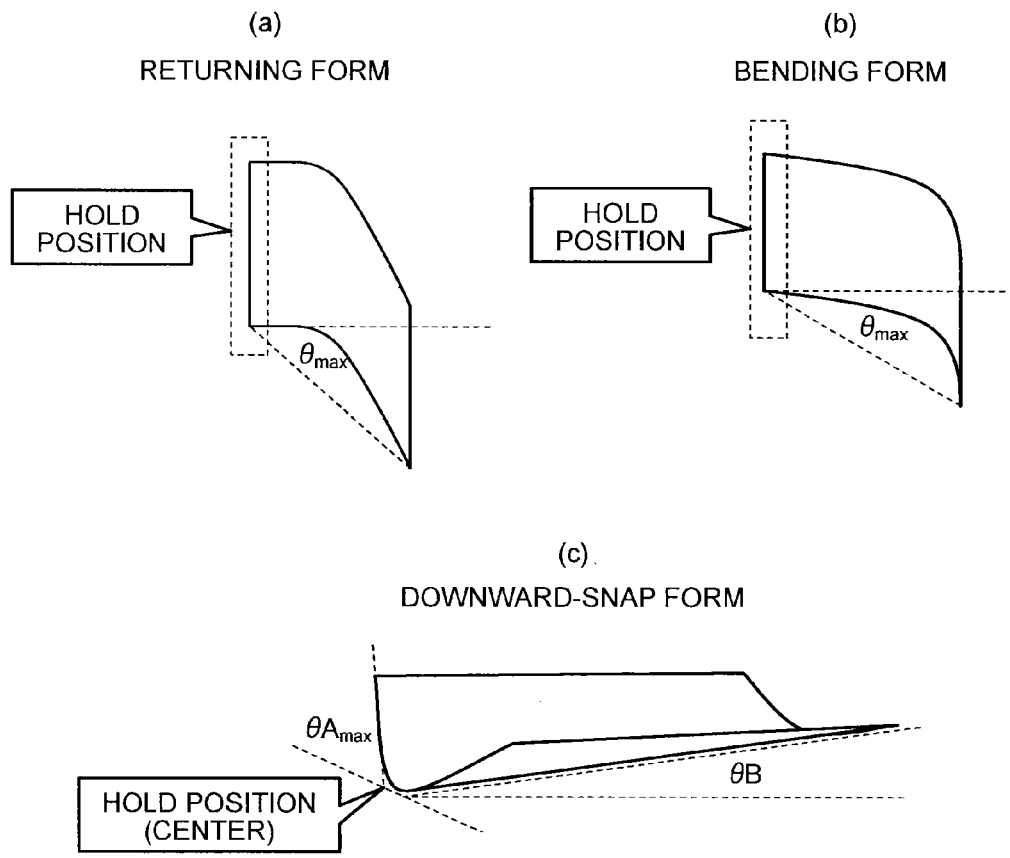
FIGS. 15(a) to 15(c) are diagrams for explaining a maximum bending angle of each folding form.

FIGS. 15(a) to 15(c) are diagrams for explaining the maximum bending angle of each of the folding forms. Specifically, FIG. 15(a) illustrates the maximum bending angle θmax of the returning form, FIG. 15(b) illustrates the maximum bending angle θmax of the bending form, and FIG. 15(c) illustrates the maximum bending angle θAmax and a downward-snap angle θB of the downward-snap form. In the returning form and the bending form, as illustrated in FIGS. 15(a) and 15(b), the maximum bending angle θmax is a maximum value of the angle (folding angle θ) between the position of the end portion opposite the hold position when the sheet is not bent and the position of the end portion opposite the hold position when the sheet is bent, on the assumption that the hold position serves as an origin.

In the downward-snap form, the center of the hold position is bowed. Therefore, as illustrated in FIG. 15C, it is assumed that, when the center of the hold position serves as an origin, a maximum value of an angle (folding angle θA) between the position of one end portion at the hold position when the sheet is not bent and the position of the same end portion at the hold position when the sheet is bent serves as a maximum bending angle θAmax. Furthermore, in the downward-snap form, it is necessary to define a final form obtained when the end portion opposite the hold position is snapped down. Therefore, as illustrated in FIG. 15(c), it is assumed that, when the center of the hold position serves as an origin, an angle between the position of the center of the end portion opposite the hold position of the sheet after completion of the downward-snap and the position of the center of the same end portion opposite the hold position of the sheet in the flat state serves as the downward-snap angle θB. When performing the process at Step S11 in FIG. 14, the downward-snap form generating unit 123 calculates the downward-snap angle θB in addition to the maximum bending angle θAmax.

Each of the returning form generating unit 121, the bending form generating unit 122, and the downward-snap form generating unit 123 of the generating unit 120 calculates the maximum bending angle θmax or θAmax based on a hardness parameter H corresponding to the sheet type input by the operating unit 101, by referring to the hardness table as described above. The sheet hardness parameter H is represented by a value ranging from 0 to 1.0 such that the sheet becomes the softest when H=0 and the sheet becomes the hardest when H=1. The sheet becomes easier to bend as the sheet becomes softer, and becomes more difficult to bend as the sheet becomes harder. Therefore, the maximum bending angles θmax and θAmax are determined such that the angles can be changed depending on the hardness of the sheet.

More specifically, the returning form generating unit 121 of the generating unit 120 calculates the maximum bending angle θmax such that the angle becomes smaller as the hardness parameter H approaches 1 (that is, as the sheet becomes harder). In the embodiment, the returning form generating unit 121 calculates the maximum bending angle θmax by Equation (1) below.

$$\theta max = \Theta \times (1-H) \tag{1}$$

Here, $\Theta$ is a predetermined angle determined in advance, and is defined so as to differ for each of the bending form, the returning form, the bouncing form, and the downward-snap form. In particular, in the case of "bouncing form", the angle $\Theta$ is extremely small; therefore, the visual quality can hardly change due to a difference in the sheet hardness H.

Figures 16, 17:
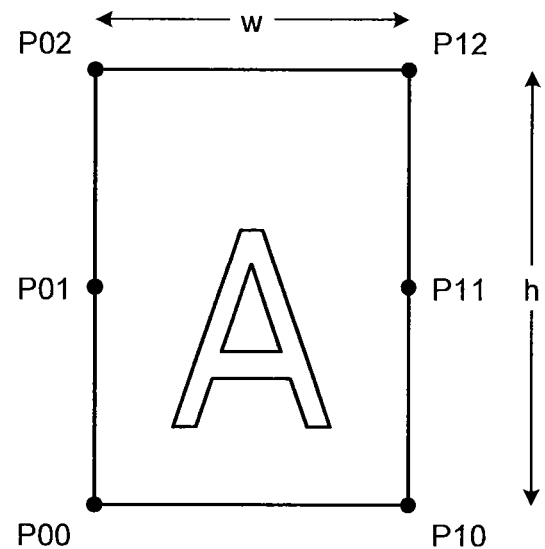
FIG. 16 is a diagram illustrating an example of a bending load table.
FIG. 17 is a diagram illustrating an example of control points.

In the case of the bending form generating unit 122, a force applied to the sheet also acts in addition to the sheet hardness. In the embodiment, as described above, the bending load table is stored, in which the magnitude of a force applied to the sheet and the correction value of the folding angle are associated with each other. FIG. 16 is a diagram illustrating an example of the bending load table. In the example illustrated in FIG. 16, an angle correction value K is defined in association with each of a strong force, a moderate force, and a weak force as a force F applied to the sheet. Values θf and θw in FIG. 16 are appropriately set to arbitrary values. The bending form generating unit 122 calculates the maximum bending angle θmax by Equation (2) below by using the angle correction value K associated with the force F applied to the sheet with reference to the bending load table.

$$\theta max = (\Theta + K) \times (1-H) \tag{2}$$

Incidentally, the force F applied to the sheet is received by the operating unit 101 from the user, similarly to the sheet type. Furthermore, while three types of forces such as the strong force, the moderate force, and the weak force are set as the force F applied to the sheet in the example illustrated in FIG. 16, the present invention is not limited thereto. It may be possible to set two types of forces or four or more types of forces. The bending form generating unit 122 calculates the maximum bending angle θmax by using the angle correction value K associated with the force F applied to the sheet input via the operating unit 101.

In the case of the downward-snap form generating unit 123, the maximum bending angle θAmax indicating a bowed portion at the hold position and the downward-snap angle θB are calculated. In the embodiment, the downward-snap form generating unit 123 calculates the maximum bending angle θAmax by Equation (3) below by using the hardness table and the bending load table, similarly to the bending form generating unit 122.

$$\theta A\max = (\Theta + K) \times (1 - H) \quad (3)$$

Furthermore, the downward-snap angle θB is proportional to the maximum bending angle θAmax but does not exceed the maximum bending angle θAmax. Therefore, in the embodiment, the downward-snap form generating unit 123 calculates the downward-snap angle θB by Equation (4) below.

$$\theta B = \theta A\max \times M \quad (4)$$

M is a constant that satisfies 0≤M≤1.

Referring back to FIG. 14, after calculating the maximum bending angle θmax (or the maximum bending angle θAmax and the downward-snap angle θB in the case of the downward-snap form), each of the returning form generating unit 121, the bending form generating unit 122, and the downward-snap form generating unit 123 calculates a plurality of control points (control point array) of a Bézier surface representing a corresponding folding form (Step S12). Then, the correcting unit 124 corrects the Bézier surface formed with the calculated control points (Step S13). Each of the returning form generating unit 121, the bending form generating unit 122, and the downward-snap form generating unit 123 repeats the processes of Steps S12 and S13 while changing the folding angle θ within the range of the maximum bending angle θmax or θAmax calculated at Step S11, to thereby dynamically generate the folding form that changes with time.

The processes at Steps S12 and S13 will be described in detail below. First, calculation of the control points for generating the returning form by the returning form generating unit 121 and correction of the Bézier surface by the correcting unit 124 will be described below.

At Step S12, the returning form generating unit 121 calculates the positions of control points of the returning form in a three-dimensional space. In the embodiment, a Bézier surface of degree 1×2 is used and six control points are calculated.

Figure 18:
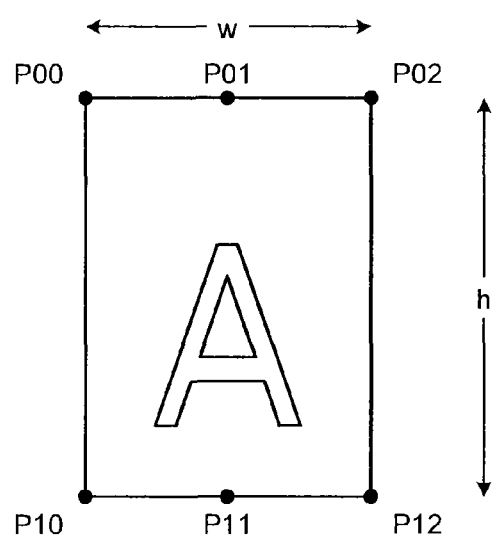
FIG. 18 is a diagram illustrating an example of the control points.

FIG. 17 and FIG. 18 are diagrams illustrating examples of the control points. If the sheet is folded in the vertical direction, as illustrated in FIG. 17, the control points are interpolated between top and bottom end points of the sheet. In contrast, if the sheet is folded in the horizontal direction, as illustrated in FIG. 18, the control points are interpolated between right and left end points of the sheet. If the sheet is in the flat form, the six control points are located on the same plane. A curved surface of each of the returning form and the bending form is obtained by controlling the six control points. Meanwhile, in FIG. 17 and FIG. 18, h is a sheet length in the vertical direction and w is a sheet width.

Figure 19:
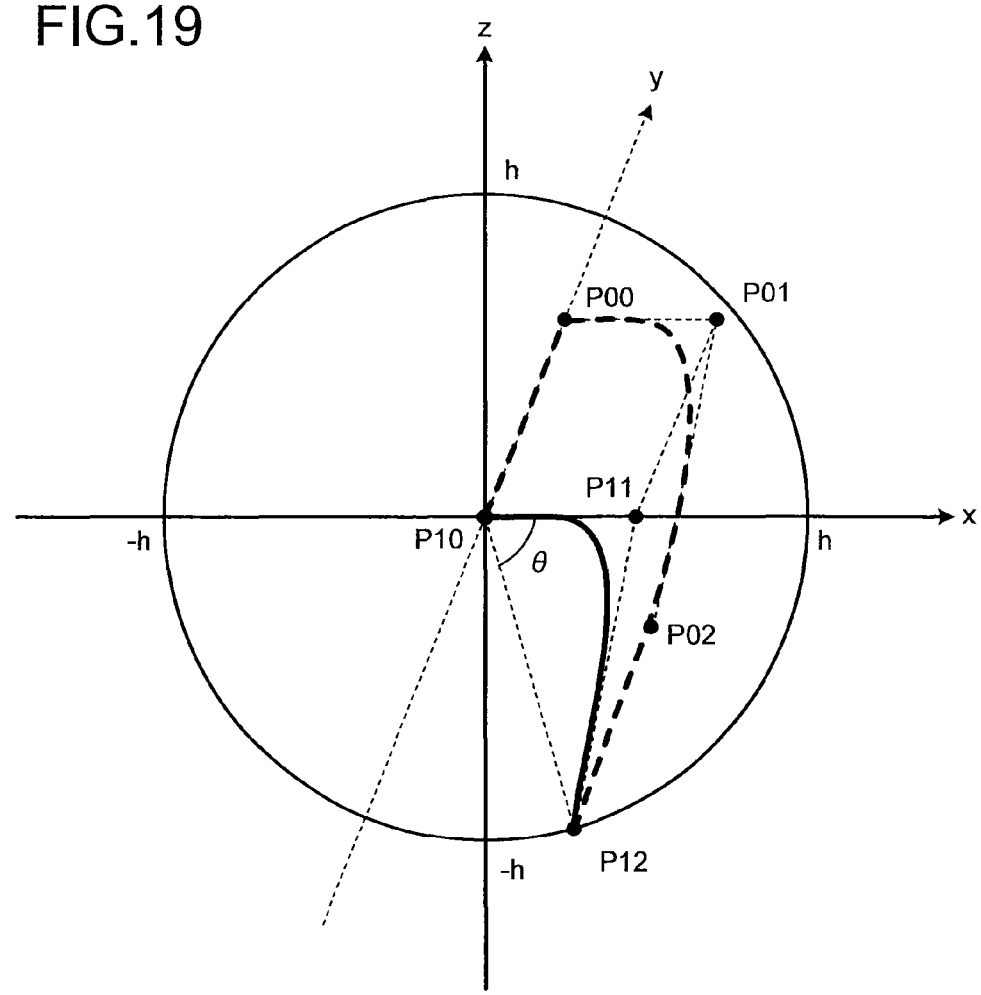
FIG. 19 is a diagram illustrating an example of control points of a returning form.

FIG. 19 is a diagram illustrating an example of control points of the returning form with the folding angle θ (≤θmax). Specifically, FIG. 19 illustrates a sheet when the sheet is bent in the vertical direction (FIG. 5) and viewed in the horizontal direction. It is assumed that the sheet is on the xy plane where z=0, when the sheet is in the flat form. The returning form generating unit 121 performs control such that three straight lines such as a straight line between control points P00 and P10, a straight line between control points P01 and P11, and a straight line between control points P02 and P12 become parallel to one another in the three-dimensional space. Therefore, if the positions of three control points P00, P01, and P02 or three control points P10, P11, and P12 are obtained, the positions of the other three control points can be obtained by parallel transport. Meanwhile, FIG. 19 illustrates a control method in which the three control points P10, P11, and P12 are focused on.

The returning form generating unit 121 places the control point P10 at the origin. The control point P11 is fixed on the x-axis regardless of the folding angle θ. However, the position of the control point P11 on the x-axis is controlled depending on the sheet hardness parameter H. If the sheet is soft (the hardness parameter H is close to zero), the sheet is bent at a portion close to the control point P10, and, if the sheet is hard (the hardness parameter H is closed to 1), the sheet is bent as a whole. Therefore, the position of the control point P11 on the x-axis is set to h/2×H such that the control point P11 is located closer to the control point P10 as the sheet becomes softer and is located closer to a point of h/2 on the x-axis as the sheet becomes harder.

The control point P12 is placed on the circumference of a circle with a radius h in the xz plane where y=0. The position of the control point P12 on the circumference of the circle is determined by using the folding angle θ. Specifically, by gradually changing the folding angle θ from the maximum bending angle θmax to 0, the position of the control point P12 moves from the circumference of a circle toward an intersection with the x-axis (x=h, y=0).

As described above, the returning form generating unit 121 can determine the positions of the three control points P10, P11, and P12 according to the folding angle θ. Furthermore, because the three control points P00, P01, and P02 are obtained by parallel transport of the three control points P10, P11, and P12, the positions of the six control points in total in the three-dimensional space can be obtained, so that the Bézier surface corresponding to the returning form can be obtained. Incidentally, while the bend in the vertical direction is described above, the same applies to the bend in the horizontal direction by replacing the x-axis with the y-axis.

Figure 20:
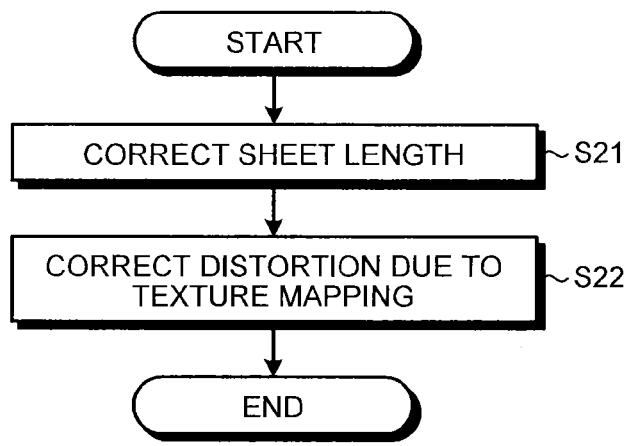
FIG. 20 is a flowchart illustrating the flow of a Bézier surface correction process performed by a correcting unit.

At Step S13, the correcting unit 124 corrects the Bézier surface. FIG. 20 is a flowchart illustrating the flow of a Bézier surface correction process performed by the correcting unit 124. The correcting unit 124 corrects the sheet length on the Bézier surface obtained by the returning form generating unit 121 (Step S21), and then performs distortion correction due to the texture mapping (Step S22).

First, correction of the sheet length will be described below. The correction of the sheet length means correction of lengths of curves at the edge of the Bézier surface formed with the six control points illustrated in FIG. 19 (i.e., a quadratic Bézier curve formed with the control points P10, P11, and P12 and a quadratic Bézier curve formed with the control points P00, P01, and P02). In FIG. 19, because the radius of the circle on which the control point P12 moves corresponds to the sheet length h in the vertical direction, the generated curves inevitably become longer than the sheet length h. Therefore, the correcting unit 124 moves the control points so that the lengths of the generated curves become the sheet length h.

The length of the Bézier curve can be approximated by a sum of line distances between vertices by dividing the Bézier curve at the vertices. In the embodiment, the correcting unit 124 obtains the length by dividing the Bézier curve by 256. It is sufficient that a length BL of the Bézier curve becomes sufficiently close to the sheet length. The correcting unit 124 corrects the length when the length of the Bézier curve is out of the acceptable range (the sheet length±n %). Incidentally, the sheet length is a vertical sheet length (height) h, and the acceptable range is from h(1−n/100) to h(1+n/100). Therefore, the correcting unit 124 corrects the length of the Bézier curve when the length is out of the acceptable range from h(1−n/100) to h(1+n/100).

Figure 21:
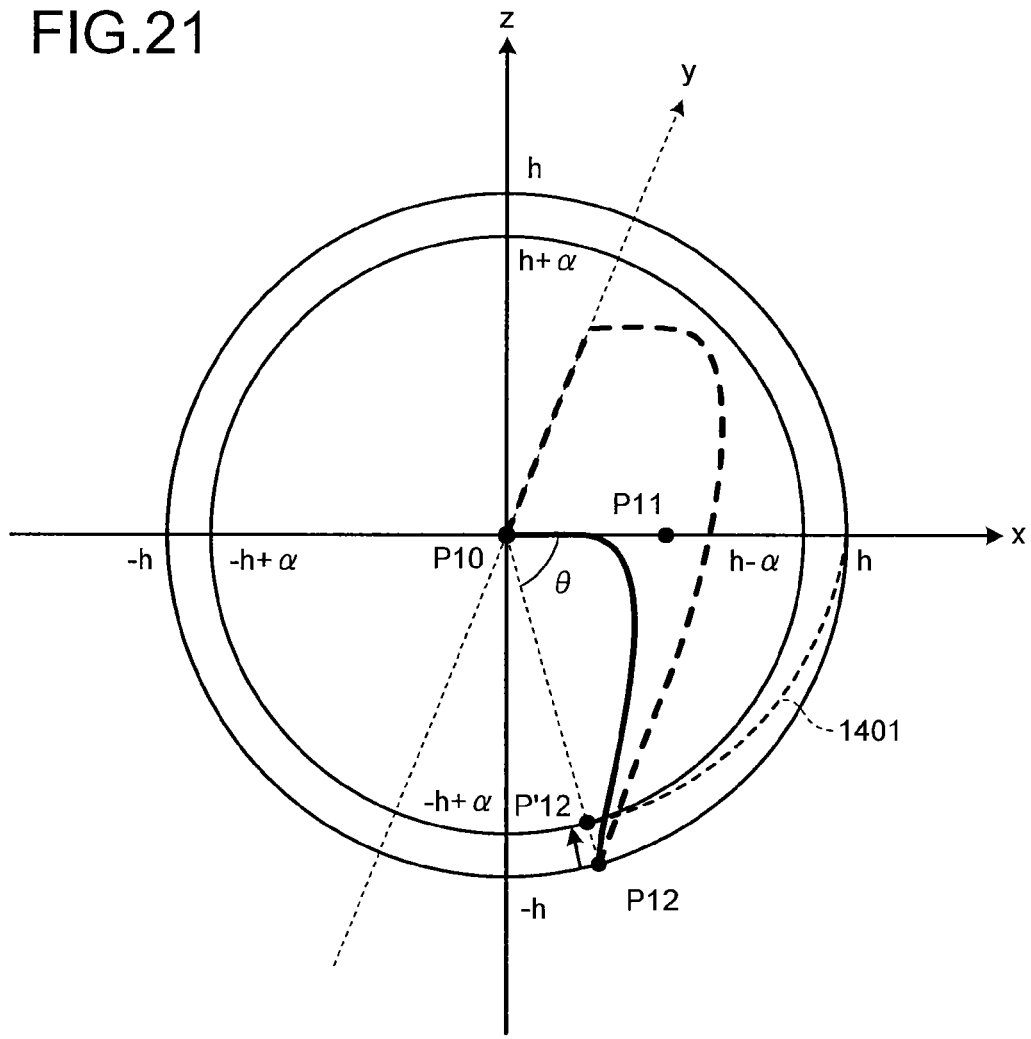
FIG. 21 is a diagram for explaining correction of a sheet length.

The control point to be moved is the control point P12 that serves as a main point for the control among the three control points P10, P11, and P12. FIG. 21 is a diagram for explaining the correction of the sheet length. If the length of the Bézier curve is out of the predetermined acceptable range as described above, as illustrated in FIG. 21, the correcting unit 124 moves the control point P12 to a point P'12 corresponding to the folding angle θ on the circumference of a circle with the radius (h−α).

The correcting unit 124 calculates a movement amount α of the control point P12 based on the length BL of the Bézier curve and based on the sheet length h before the correction. Because the sheet length is the vertical sheet length (height) h, if the length of the Bézier curve is out of the acceptable range, the correcting unit 124 calculates the movement amount α of the control point P12 by using Equation (5) below.

$$\text{Movement amount } \alpha = (BL-h)/2 \tag{5}$$

Accordingly, a new Bézier curve with the corrected length is determined. The correcting unit 124 repeats the same process until the length of the new Bézier curve falls within the acceptable range to thereby obtain the position of the control point P12, and corrects the length of the Bézier curve. The control point P12 (P12') after the correction moves along a trajectory denoted by 1401 along with a change in the folding angle θ. The correcting unit 124 also corrects the position of the control point P02 illustrated in FIG. 19 similarly to the control point P12, and corrects the length of the quadratic Bézier curve formed with the control points P00, P01, and P02 in the same manner as described above.

Figure 22:
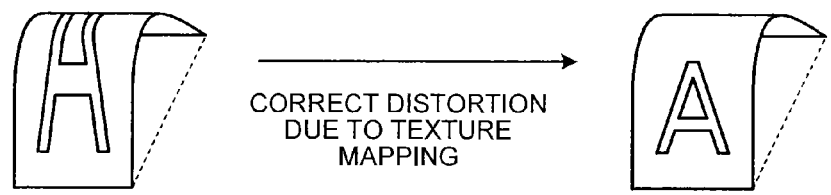
FIG. 22 is a diagram illustrating distortion due to texture mapping.
Figure 23:
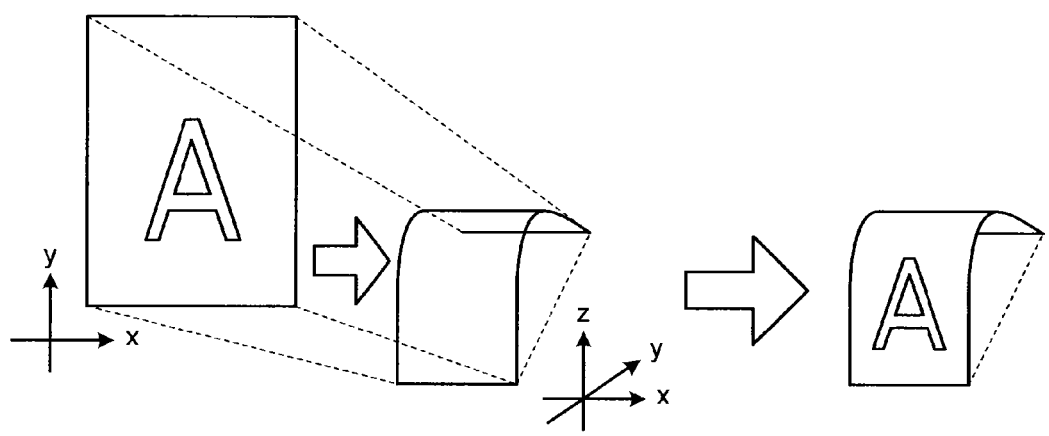
FIG. 23 is a diagram for explaining correction of the distortion due to the texture mapping.

Subsequently, at Step S22, the correcting unit 124 corrects distortion due to the texture mapping. FIG. 22 is a diagram illustrating distortion due to the texture mapping. FIG. 23 is a diagram for explaining the distortion correction due to the texture mapping. The correcting unit 124 corrects distortion as illustrated in FIG. 22 that occurs when texture mapping is performed for attaching texture being a two-dimensional image to a curved surface of a three-dimensional image, in the manner as illustrated in FIG. 23.

A quadratic Bézier surface is used also in the region of the texture image in order to allow the returning form generating unit 121 to use the parametric representation of the Bézier surface when attaching a texture image (an image for mapping the print data to the three-dimensional space) to a cubic Bézier surface. In general, the Bézier surface is represented by S(u, v) with a horizontal parameter u (0≤u≤1) and a vertical parameter v (0≤v≤1). It is assumed that the Bézier surface of degree 1×2 generated on the three-dimensional space by the returning form generating unit 121 is denoted by S(u, v), and a Bézier surface on the two-dimensional plane for the texture image is denoted by T(u, v). In the texture mapping, distortion occurs because the position T(u, v) on the texture image determined by u and v is associated with the position S(u, v).

Figure 24:
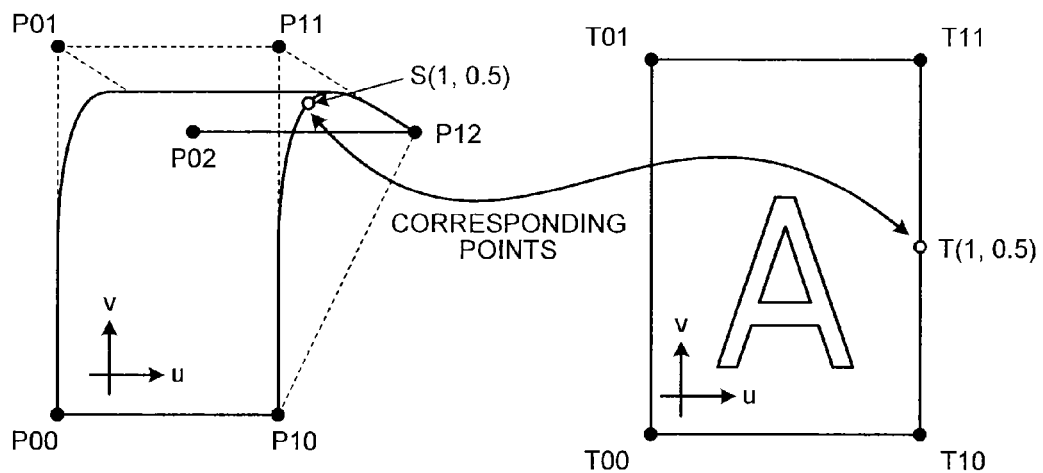
FIG. 24 is a diagram illustrating positions of S(1, 0.5) and T(1, 0.5) when u=1 and v=0.5.

FIG. 24 is a diagram illustrating the positions of S(1, 0.5) and T(1, 0.5) when u=1 and v=0.5. As can be seen from FIG. 24, if the position T(u, v) on the texture image is associated with the position S(u, v), distortion occurs in the v direction. Meanwhile, the u direction corresponds to a straight line and the parameter u represents a distance, so that no distortion occurs in the u direction.

Figure 25:
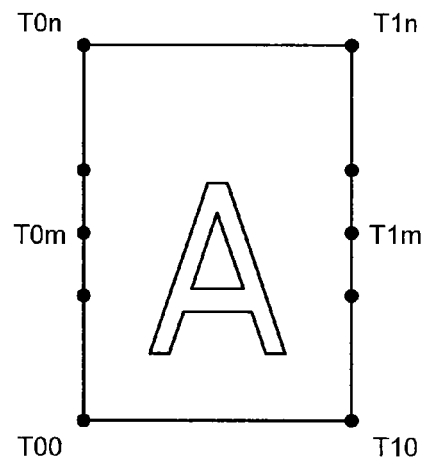
FIG. 25 is a diagram illustrating an example of placement of control points to be added as control points of a Bézier surface for a texture image.
Figure 26:
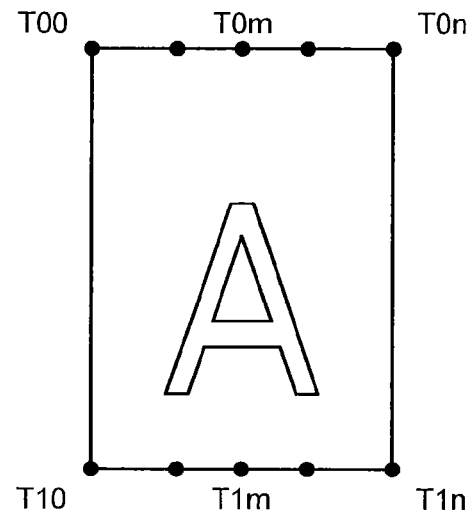
FIG. 26 is a diagram illustrating another example of placement of control points to be added as control points of a Bézier surface for the texture image.

The correcting unit 124 adds control points to the Bézier surface for the texture image in order to correct the distortion in the v direction. FIG. 25 and FIG. 26 are diagrams illustrating examples of placement of the control points to be added as the control points of the Bézier surface for the texture image.

The control points to be added are determined based on a sheet bending direction. FIG. 25 illustrates an example of the placement of 2×n control points on the Bézier surface for the texture image when the sheet is bent in the vertical direction. When the sheet is bent in the vertical direction, as illustrated in FIG. 25, the control points are added between the top and the bottom end points.

FIG. 26 illustrates an example of placement of 2×n control points on the Bézier surface for the texture image when the sheet is bent in the horizontal direction. When the sheet is bent in the horizontal direction, as illustrated in FIG. 26, the control points are added between the right and the left end points.

Because the distortion due to the texture mapping occurs in the v direction, the correcting unit 124 corrects the distortion due to the texture mapping by using the Bézier curve formed with the control points P10, P11, and P12.

Incidentally, assuming that P(t) (0≤t≤1) represents the Bézier curve formed with the control points P10, P11, and P12, L(0, t) represents the length of an arc from P(0) to P(t) (L(0, t) is normalized such that L(0, 1)=1), T10, . . . , T1n represent control points for the texture image, and Q(t) represents the Bézier curve formed with the control points T10, . . . , T1n, the correcting unit 124 adds, as the correction, the control points such that Equation (6) below is satisfied.

$$L(0,t)=Q(t) \tag{6}$$

In general, a Bézier curve of n-th degree is defined by n+1 control points Pi, and represented by Equations (7) and (8) below.

$$P(t) = \sum_{i=0}^{n} B_i^n(t) P_i \tag{7}$$

$$B_i^n(t) = \binom{n}{i}(1-t)^{n-i} \cdot t^i \tag{8}$$

Therefore, to obtain L(0, t')=Q(t') at a certain point t=t' between the end points T10 and T1n, it is sufficient that one control point for the texture image is added such that n=2 to obtain Q(t) as a quadratic Bézier curve formed with the control points T10, T11, and T12. This means that the x-coordinate of the control point denoted by Q(t) is fixed, the y-coordinate of T10 and the y-coordinate of T12 can be fixed because the y-coordinate of T10 is zero and the y-coordinate of T12 is the same as the image height, and the control pint t' is added. In this case, however, it is not always true that L(0, t")=Q(t") in other cases where t=t". To satisfy L(0, t)=Q(t) for both of t' and t", the correcting unit 124 adds two control points such that n=3, and obtains a cubic Bézier curve formed with the control points T10, T11, T12, and T13. Specifically, control points T11, . . . , T1(n−1) are added so that L(0, t)=Q(t) at each of points t=$t_2$, . . . , $t_{n-1}$ between the end points T10 and T1n. Assuming that the y-coordinates of the points T10, T11, . . . , T1n are respectively denoted by $r_0, r_1, \ldots, r_n$, Equation (9) below is satisfied. In this case, $r_1, \ldots, r_{n-1}$ are unknowns.

$$\begin{pmatrix} L(0, t_1) \\ L(0, t_2) \\ \vdots \\ L(0, t_{n-1}) \\ 1 \end{pmatrix} = \qquad (9)$$

$$\begin{pmatrix} B_1^n(t_1) & B_2^n(t_1) & \cdots & B_{n-1}^n(t_1) & B_0^n(t_1)r_0 + B_n^n(t_1)r_n \\ B_1^n(t_2) & B_2^n(t_2) & \cdots & B_{n-1}^n(t_2) & B_0^n(t_2)r_0 + B_n^n(t_2)r_n \\ \vdots & \vdots & \ddots & \vdots & \vdots \\ B_1^n(t_{n-1}) & B_2^n(t_{n-1}) & \cdots & B_{n-1}^n(t_{n-1}) & B_0^n(t_{n-1})r_0 + B_n^n(t_{n-1})r_n \\ 0 & 0 & \cdots & 0 & 1 \end{pmatrix} \begin{pmatrix} r_1 \\ r_2 \\ \vdots \\ r_{n-1} \\ 1 \end{pmatrix}$$

By solving Equation (6) and converting it to an expression for obtaining $r_1, \ldots, r_{n-1}$, the control points T10, T11, ..., T1n can be determined. In the embodiment, it is assumed that $t_1 = 1/n, t_2 = 2/n, \ldots, t_{n-1} = (n-1)/n$.

Incidentally, to cause the display control unit 131 to actually draw the cubic Bézier surface for the texture mapping, the Bézier curve is divided by the values l and m, which are designated in the u direction and the v direction respectively, and generates a polygon by using the vertices of the divided curves for the drawing. Therefore, when dividing the Bézier curve by m in the v direction, it is sufficient for the correcting unit 124 to add m−1 control points. In the embodiment, the correcting unit 124 adds seven control points to obtain a Bézier surface of degree 1×8 as the Bézier surface for the texture image.

As described above, by causing the correcting unit 124 to specify drawing positions on the three-dimensional space, it is possible to correct distortion due to the texture mapping.

Generation of the bending form, that is, calculation of the control points of the bending form on the three-dimensional space by the bending form generating unit 122 and correction of the Bézier surface by the correcting unit 124 will be described below.

Figure 27:
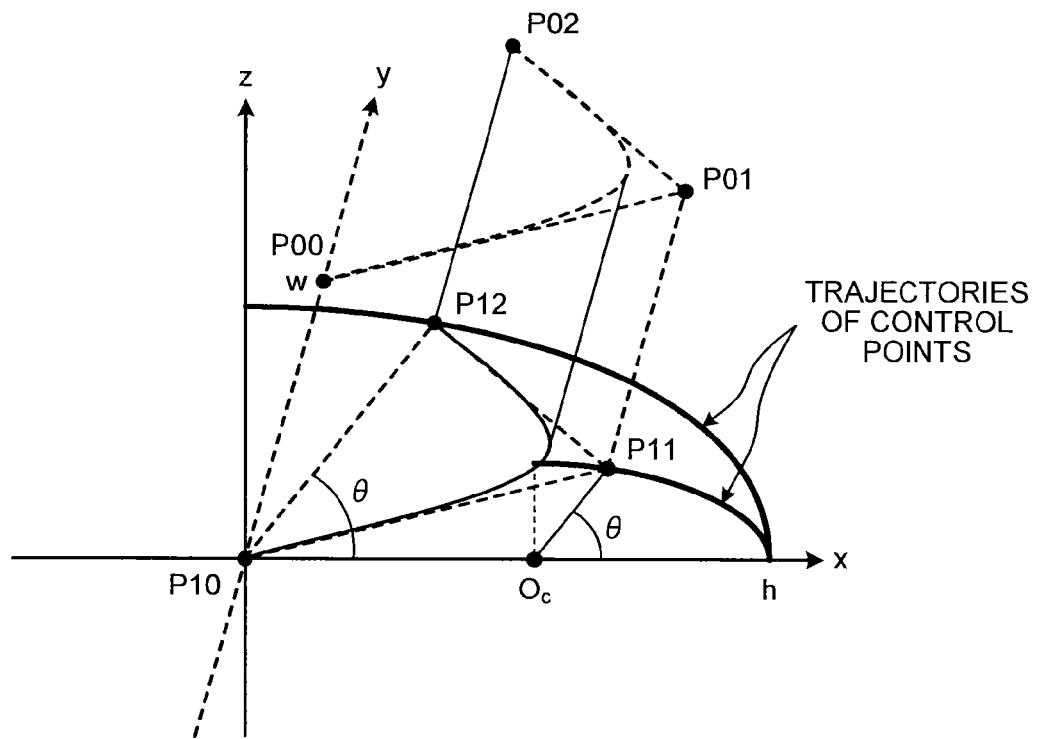
FIG. 27 is a diagram illustrating an example of control points of a bending form.

The bending form generating unit 122 calculates six control points of the Bézier surface on the three-dimensional space. FIG. 27 is a diagram illustrating an example of control points of the bending form with the folding angle θ(≤θmax). Similarly to the returning form illustrated in FIG. 19, FIG. 27 illustrates a control method in which the three control points P10, P11, and P12 are focused on. The control points P10, P11, and P12 are located on the xz plane where y=0, and the bending form generating unit 122 places the control point P10 at the origin.

A trajectory of the control point P12 will be explained below. The bending form generating unit 122 places the control point P12 on an ellipse with the control point P10 at the center. Meanwhile, a long diameter R of the ellipse is set to the sheet height (vertical length) h, and a short diameter r changes depending on the sheet hardness parameter H. If the sheet becomes harder, the sheet is less bent, so that the short diameter increases and approaches the long diameter R. In contrast, if the sheet becomes softer, the sheet is more bent, so that the short diameter decreases and a difference between the short diameter r and the long diameter R increases. The short diameter r that satisfies the above characteristics is represented by Equation (10) below.

Short diameter $r = R \times H$ \hfill (10)

The bending form generating unit 122 determines the position of the control point P12 on the ellipse by using the folding angle θ. Specifically, by gradually changing the folding angle θ from the maximum bending angle θmax to 0, the position of the control point P12 moves on the ellipse toward the intersection with the x-axis (x=h, y=0).

A trajectory of the control point P11 will be described below. The bending form generating unit 122 sets the control point P11 on an ellipse with a point $O_c$ on the x-axis at the center. The center $O_c$ of the ellipse matches the control point P10 when the sheet is too hard to bend, that is, when the hardness parameter H=1. In contrast, when the sheet is extremely soft, that is, when the hardness parameter H=0, the center $O_c$ of the ellipse matches h on the x-axis with the folding angle θ of 90 because of the characteristics of the Bézier curve. The bending form generating unit 122 sets the center $O_c$ of the ellipse and places the control point P11 on the ellipse so as to satisfy the above characteristics. The center $O_c$ of the ellipse on which the control point P11 is placed is located on the x-axis and is represented by Equation (11) below according to the relation with the ellipse on which the control point P12 is placed.

$$O_c = R - r \times \sin\left(\frac{\pi}{2} \cdot \frac{r}{R}\right) = R - RH\sin\left(H \cdot \frac{\pi}{2}\right) \qquad (11)$$

Next, it is assumed that a long diameter of the ellipse to be the trajectory of the control point P11 is denoted by C and a short diameter of the ellipse is denoted by c. The bending form generating unit 122 determines the long diameter C and the short diameter c such that the control point P11 is located on the segment P10-P12 when the sheet is too hard to bend, that is, when the hardness parameter H=1, and the control point P11 is located at h on the x-axis when the sheet is extremely soft, that is, the hardness parameter H=0. The bending form generating unit 122 defines the long diameter C by Equation (12) below and the short diameter c by Equation (13) below so that the above characteristics can be satisfied.

$$\text{Long diameter } C = RH\sin\left(H \cdot \frac{\pi}{2}\right)\Big/2 \qquad (12)$$

$$\text{Short diameter } c = C \times H = RHH\sin\left(H \cdot \frac{\pi}{2}\right)\Big/2 \qquad (13)$$

The bending form generating unit 122 calculates the position of the control point P11 on the ellipse obtained as described above, by using the folding angle θ. Specifically, by gradually changing the folding angle θ from the maximum bending angle θmax to 0, the position of the control point P11 moves on the ellipse toward the intersection with the x-axis (x=h, y=0).

As described above, the bending form generating unit 122 can determine the positions of the three control points P10, P11, and P12 according to the folding angle θ. Because the three control points P00, P01, and P02 are obtained by parallel transform of the three control points P10, P11, and P12, it is possible to obtain the six control points in total in the three-dimensional space, so that a Bézier surface corresponding to the bending form can be obtained. Incidentally, while the vertical bend is described above, the same applies to horizontal bend by replacing the x-axis with the y-axis.

Subsequently, the correcting unit 124 corrects the sheet length of the bending form (Step S21), corrects distortion due to the texture mapping (Step S22) and corrects the Bézier surface of the bending form (Step S13).

In the correction of the sheet length of the bending form, similarly to the correction in the returning form, it is sufficient that the length BL of the Bézier curve becomes sufficiently close to the sheet length. Namely, the sheet length is corrected when the length of the Bézier curve is out of the acceptable range (the sheet length±n %). The acceptable range of the sheet length h is set to a range from h(1−n/100) to h(1+n/100).

The correcting unit 124 moves the control point P11 that serves as a main point for the control among the three control points P10, P11, and P12. If the length of the Bézier curve is longer than the predetermined acceptable range, the correcting unit 124 moves the control point P11 in the negative direction along the x-axis. In contrast, if the length of the Bézier curve is shorter than the predetermined acceptable range, the correcting unit 124 moves the control point P11 in the positive direction along the x-axis.

Furthermore, the correcting unit 124 calculates the movement amount α based on the length BL of the Bézier curve and based on the sheet length h before the correction. Because the sheet length is the sheet height (the vertical length) h, if the length of the Bézier curve is out of the acceptable range, the correcting unit 124 calculates the movement amount α of the control point P12 by using Equation (5) as described above.

Accordingly, a new Bézier curve with the corrected length is determined. The correcting unit 124 repeats the same process until the length of the new Bézier curve falls within the acceptable range to thereby obtain the position of the control point P12, and corrects the length of the Bézier curve. The correcting unit 124 also corrects the position of the control point P01 illustrated in FIG. 27 in the same manner as the control point P11, and also corrects the quadratic Bézier curve formed with the control points P00, P01, and P02 in the same manner as described above.

Subsequently, at Step S22, the correcting unit 124 corrects distortion due to the texture mapping. The distortion due to the texture mapping occurs because of the same cause as in the returning form. Therefore, the correcting unit 124 corrects the distortion due to the texture mapping for the bending form similarly to the correction of the distortion due to the texture mapping for the returning form.

Incidentally, the bouncing form is a part of the behavior of the bending form as described above. Therefore, the bouncing form is generated in the same manner as the bending form except that the maximum bending angle θmax is calculated in a different manner. In the case of the bouncing form, a force F applied to the sheet is not taken into account. Therefore, the maximum bending angle θmax is calculated by the above Equation (1), similarly to the returning form.

Next, generation of the downward-snap form, that is, calculation of the control points of the downward-snap form on the three-dimensional space and correction of the Bézier surface by the correcting unit 124 by the downward-snap form generating unit 123 will be described below.

Figure 28:
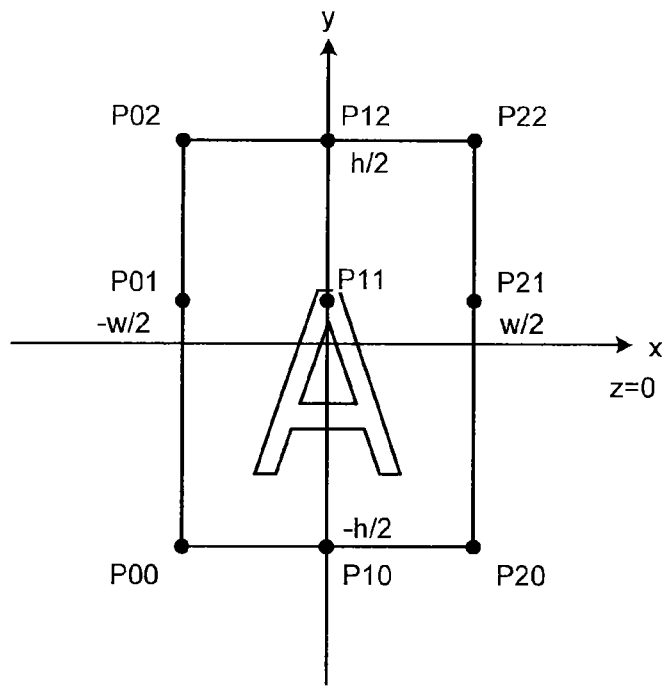
FIG. 28 is a diagram illustrating an example of control points.

The downward-snap form generating unit 123 first calculates the positions of control points on the three-dimensional space. In the embodiment, the downward-snap form is generated by using a Bézier surface of degree 2×2, so that nine control points are calculated. As illustrated in FIG. 28, the positions of the control points are interpolated between end points of the sheet on the assumption that the sheet width is denoted by w and the sheet height is denoted by h.

Straight lines that pass the interpolated control points and control points on the opposite side are formed in the vertical direction (a straight line between P10 and P12) and in the horizontal direction (a straight line between P01 and P21), and a control point (the control point P11) is also interpolated at the position of the intersection of the straight lines. As for the coordinate, assuming that the center of the sheet serves as the origin, the positive z-direction on the plane where z=0 serves as the front side of the sheet when the sheet is flat.

If "bottom" is designated as the sheet hold position in the downward-snap form, in the initial state (see the figure (a) in FIG. 4), the bouncing form is obtained in which the top side (the control points P02, P12, and P22) of the sheet bounces forward. The six control points among the nine control points of the downward-snap form correspond to the six control points of the bending form including the bouncing form as described above. The control points P00, P01, and P02 of the downward-snap form are the same as those of the bending form, and the control points P20, P21, and P22 of the downward-snap form correspond to the control points P10, P11, and P12 of the bending form. In the embodiment, the position of the origin differs between the bending form and the downward-snap form. Therefore, as the coordinate to be used, all of the control points of the bending form are parallel transported to the coordinate of the downward-snap form.

The control points P10, P11, and P12 in the initial state of the downward-snap form are located on x=0, and the y-coordinates and the z-coordinates are the same as those of the control points P00, P01, and P02, respectively. The x-coordinate of each of the control points P00, P01, and P02 is −w/2. The y-coordinates and the z-coordinates of the control points P20, P21, and P22 are the same as those of the control points P00, P01, and P02, respectively, and the x-coordinate of each of the control points P20, P21, and P22 is w/2.

Next, a form change for bowing the center of the hold position in the downward-snap form will be explained below. In the downward-snap form, the form changes such that the center of the sheet hold position is bowed from the initial state of the bouncing form. In the case of the downward-snap form where "bottom" is designated as the sheet hold position, the form change as described above can be realized by changing the positions of the control points P00 and P20 at the both ends of the Bézier curve formed with the three control points P00, P10, and P20 that represent the bottom end portion serving as the hold position of the sheet, in accordance with the folding angle θA.

Figure 29:
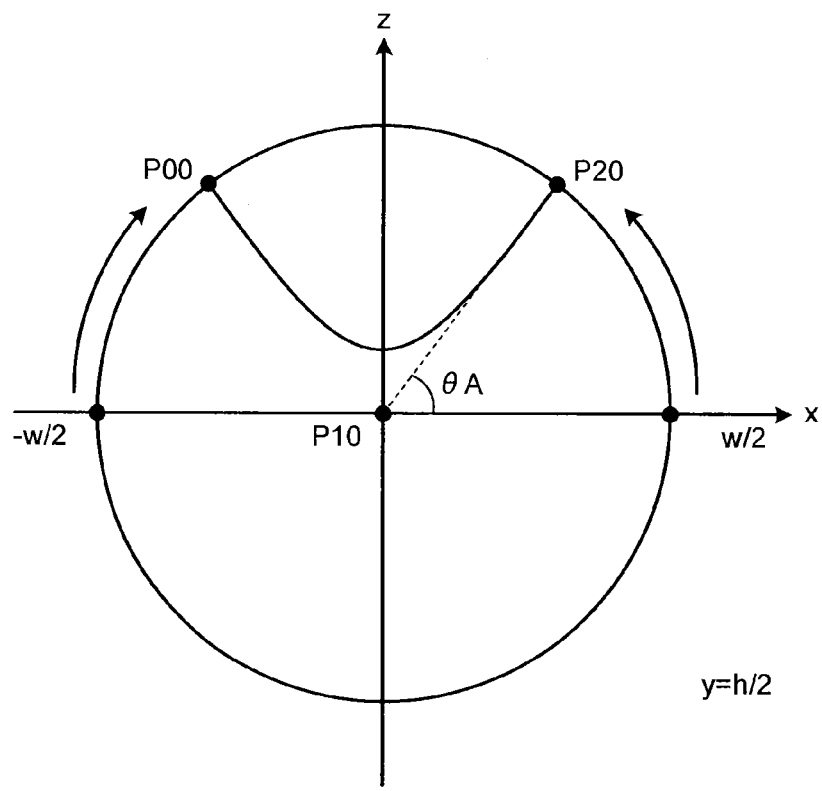
FIG. 29 is a diagram illustrating an example of control points of a downward-snap form.

FIG. 29 is a diagram illustrating an example of the control points P00, P10, and P20 of the downward-snap form with the folding angle θA (≤θAmax). Specifically, FIG. 29 illustrates the bottom end portion serving as the hold position of the sheet viewed in the direction parallel to the sheet surface in order that trajectories of the control points P00 and P20 can be viewed.

In FIG. 29, the y-coordinates of the control points P00, P10, and P20 do not change. As illustrated in FIG. 29, the downward-snap form generating unit 123 moves the control points P00 and P20 on the circumference of a circle with the control point P10 at the center and with a diameter corresponding to the lateral width w of the sheet. Namely, by changing the folding angle θA from zero to the maximum bending angle θAmax and changing the positions of the control points P00 and P20 on the circumference of the circle according to the folding angle θA, the form change for bowing the center of the hold position in the downward-snap form is represented.

Next, a form change for extending (snapping down) the end portion on the opposite side of the hold position in the downward-snap form will be explained below. In the downward-snap form, the form changes such that the end portion on the opposite side of the sheet hold position is extended and sagged down (snapped down) from the initial state of the bouncing form. In the downward-snap form where "bottom" is designated as the sheet hold position, the form change as described above can be realized by changing the positions of the control points P02, P12, and P22 and the positions of the control points P01, P11, and P21.

The control points P02, P12, and P22 will be explained below. The control points P02 and P12 differ from the control points P22 only in the x-coordinates. Therefore, if the position of the control point P22 on the yz plane is determined, the positions of the control points P02 and P12 can be determined based on the position of the control point P22. The control point P22 of the downward-snap form can be calculated in the same manner as the control point P22 of the returning form. Namely, the control point P22 moves on the circumference of the circle with the radius h (=the sheet length).

Figure 30:
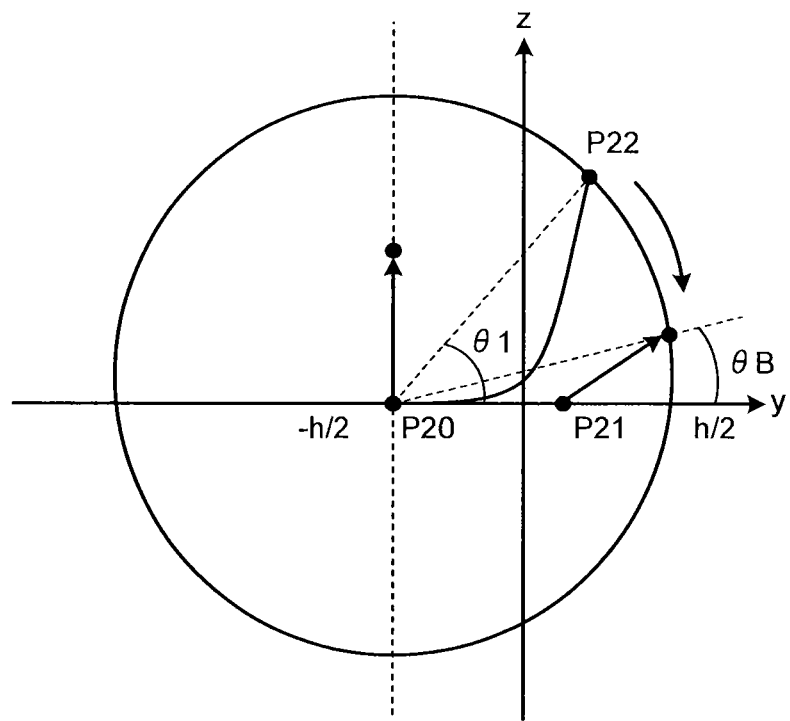
FIG. 30 is a diagram illustrating another example of control points of the downward-snap form.

FIG. 30 is a diagram illustrating an example of the control points P20, P21, and P22 corresponding to the angle θ1 (≤θB) that changes with time. Specifically, FIG. 30 illustrates the right end portion side of the sheet viewed in the direction parallel to the sheet surface in order that trajectories of the control points P21 and P22 can be viewed.

As illustrated in FIG. 30, the downward-snap form generating unit 123 moves the control point P22 on the circumference of the circle with the radius h (=the sheet length) by changing the angle θ1 with time until the angle θ1 reaches the downward-snap angle θB as described above. In this case, while the control points P10 is fixed at the center of the circle when the returning form is generated, the downward-snap form generating unit 123 changes the z-coordinate of the control point P20 along with an increase in the folding angle θA (see FIG. 29). If the position of the control point P22 on the yz plane is determined as described above, the positions of the control points P02 and P12 can be obtained by only giving the x-coordinates as described above.

The control points P01, P11, and P21 will be explained below. The control points P01, P11, and P21 are moved such that the control points P01, P11, and P21 approach the control points P02, P12, and P22, respectively, as the angle θ1 that changes with time approaches the downward-snap angle θB, and, if the angle θ1 reaches the downward-snap angle θB, the control points P01, P11, and P21 match the control points P02, P12, and P22, respectively.

Figure 31:
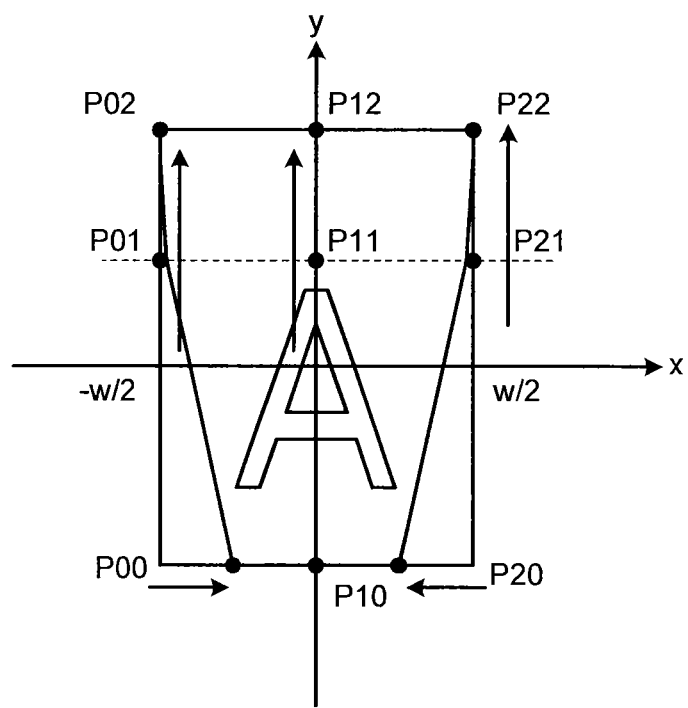
FIG. 31 is a diagram for explaining movement of the control points.

FIG. 31 is a diagram for explaining movement of the control points, in particular, a schematic diagram illustrating how the control points P01, P11, and P21 approach the control points P02, P12, and P22, respectively. By changing the positions of the control points P01, P11, and P21 as described above, it becomes possible to represent a form change in which the most bent portion of the sheet gradually moves toward the end portion opposite the sheet hold position.

The control points P01, P11, and P21 are placed parallel to one another on the x-axis such that the x-coordinate of the control point P01 is −w/2, the x-coordinate of the control point P11 is 0, and the x-coordinate of the control point P21 is w/2. Therefore, if the coordinate of one of the three control points is obtained, the coordinates of the other control points can be obtained. In the embodiment, the coordinate of the control point P21 is obtained, and then the coordinates of the control points P01 and P11 are obtained based on the coordinate of the control point P21. Because the initial state of the downward-snap form is fixed, as illustrated in FIG. 30, the control point P21 matches the control point P22 when the angle θ1 reaches the downward-snap angle θB. To cause the control point P21 to approach the control point P22 according to the change in the angle θ1, the control point P21 is controlled so as to move to the control point P22 along with the change from the angle θ1 in the initial state of the downward-snap form to the downward-snap angle θB.

A form change for bowing the center of the end portion opposite the sheet hold position can be realized by processing the control points P02, P12, and P22 in the same manner as the control points P00, P10, and P20 (see FIG. 29).

As described above, the downward-snap form generating unit 123 can determine the positions of the nine control points in the three-dimensional space, and can obtain a Bézier surface corresponding to the downward-snap form. While the downward-snap in the vertical direction is described in the above example, the same applies to the downward-snap in the horizontal direction by replacing the x-axis with the y-axis.

Subsequently, the correcting unit 124 corrects the sheet length of the downward-snap form (Step S21), corrects distortion due to the texture mapping (Step S22), and corrects the Bézier surface of the downward-snap form (Step S13).

In the correction of the sheet length of the downward-snap form, correction according to the sheet width w and correction according to the sheet length h are performed. In the correction according to the sheet width w, the positions of the control points are corrected if needed.

First, the correction according to the sheet width w will be described below. The correction according to the sheet width w is performed when the length of the Bézier curve formed with the control points P00, P10, and P20 is out of the acceptable range (the sheet width±n %) in the form change for bowing the center of the hold position as illustrated in FIG. 29. The acceptable range of the sheet width w is set to w(1−n/100) to w(1+n/100).

Figure 32:
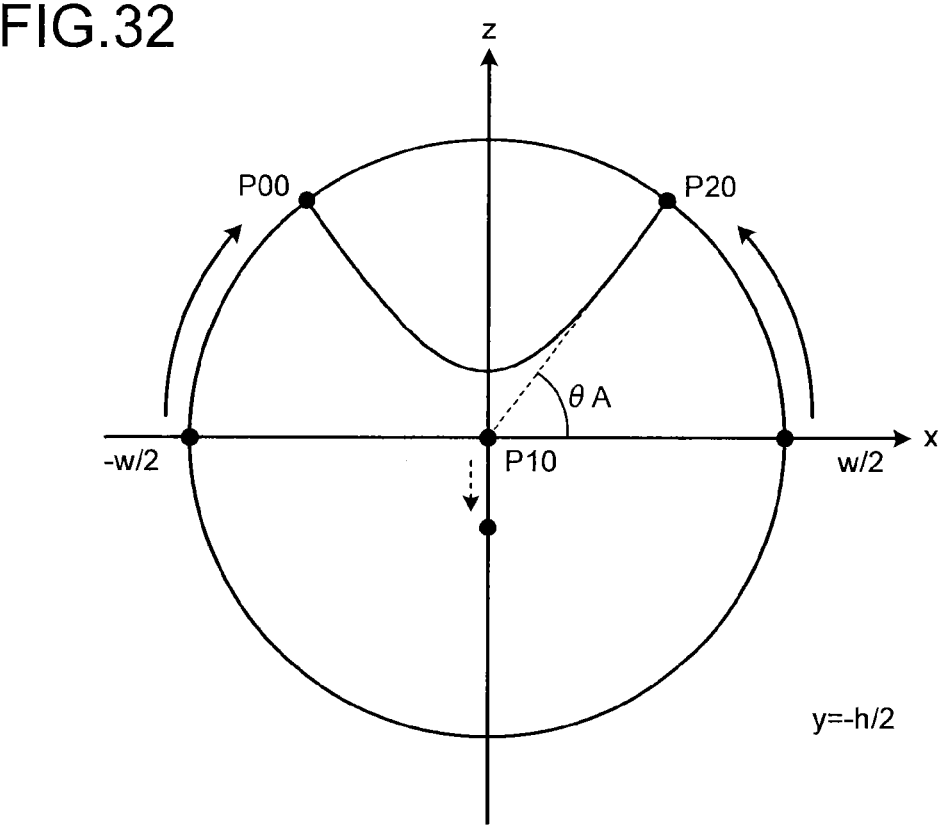
FIG. 32 is a diagram for explaining a correction method according to a sheet width.

FIG. 32 is a diagram for explaining a method for the correction according to the sheet width w. The correcting unit 124 moves the control point P10 among the three control points P00, P10, and P20. If the length BL of the Bézier curve formed with the control points P00, P10, and P20 is out of the acceptable range, the correcting unit 124 subtracts the movement amount α from the z-coordinate of the control point P10 on the assumption that the movement amount α=(BL−w)/2. The correcting unit 124 repeats the above process until the length BL of the Bézier curve falls within the acceptable range from w(1−n/100) to w(1+n/100).

In the actual operation, the center of the sheet hold position corresponding to the control point P10 needs to be a fixed point that does not move in the negative direction of the z-axis. Therefore, if the z-coordinate of the control point P10 is changed through the above process, the positions of all of the three control points P00, P10, and P20 are corrected by moving the control points P00, P10, and P20 upward in the positive direction of the z-axis so that the control point P10 becomes a fixed point.

Next, the correction according to the sheet length h will be explained below. The correction according to the sheet length h is performed when the length of the Bézier curve formed with the control points P00, P01, and P02 (the control points P20, P21, and P22) is out of the acceptable range (the sheet length±n %) in the form change for downward-snap as illustrated in FIG. 30 and FIG. 31. The acceptable range of the sheet length is set to h(1−n/100) to h (1+n/100).

Figure 33:
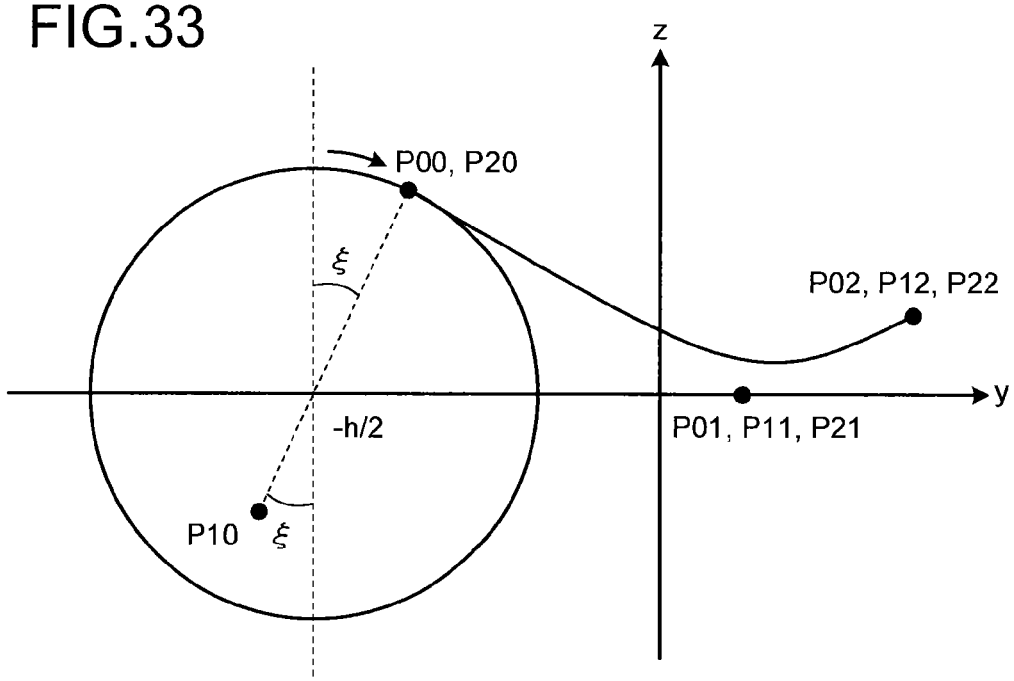
FIG. 33 is a diagram for explaining a correction method according to a sheet length.

FIG. 33 is a diagram for explaining a method for the correction according to the sheet length h. The correcting unit 124 moves the control point P00 (P20) among the three control points P00, P01, and P02 (P20, P21, and P22). If the length BL of the Bézier curve formed with the control points P00, P10, and P20 (P20, P21, and P22) is out of the predetermined acceptable range, the correcting unit 124 moves the position of the control point P00 (P20) so that the length BL of the Bézier curve falls within the acceptable range.

However, because the Bézier curve formed with the control points P00, P10, and P20 has already been corrected as described above, it is necessary to perform the correction so that the length of the Bézier curve does not change. Therefore, as illustrated in FIG. 33, the correcting unit 124 rotates the plane, where y=−h/2 and on which the control points P00, P10, and P20 are placed, in order to change the position of the control point P00 (P20). Specifically, the correcting unit 124 gradually increases a rotation angle until the length BL of the Bézier curve formed with the control points P00, P10, and P20 (P20, P21, and P22) falls within the acceptable range from h(1−n/100) to h(1+n/100).

Subsequently, at Step S22, the correcting unit 124 corrects distortion due to the texture mapping. The distortion due to the texture mapping in the downward-snap form is corrected by correcting large distortion that occurs in the vertical direction, in the same manner as the correction of the distortion due to the texture mapping in the returning form.

As described above, each of the returning form generating unit 121, the bending form generating unit 122, and the downward-snap form generating unit 123 of the generating unit 120 dynamically generates the display data (the Bézier control point arrow and the texture image) for forming a 3D image according to a folding-form generation instruction issued by the specifying unit 102. Then, the pieces of the display data generated by the generating unit 120 are sequentially sent to the display control unit 131. Therefore, the 3D image representing the sheet behavior according to the sheet handling method (the hold position and the operation) designated by the user is displayed on the display unit 130, as a preview in the form of a moving image such as animation.

As described above, according to the display apparatus of the embodiment, the 3D image representing the behavior according to the sheet handling method is displayed as a preview in the form of a moving image. Therefore, it is possible to display a preview that accurately represents the reality of the sheet. As a result, it becomes possible to accurately inform the user of the usability of the sheet on which the print data is printed.

Figure 34:
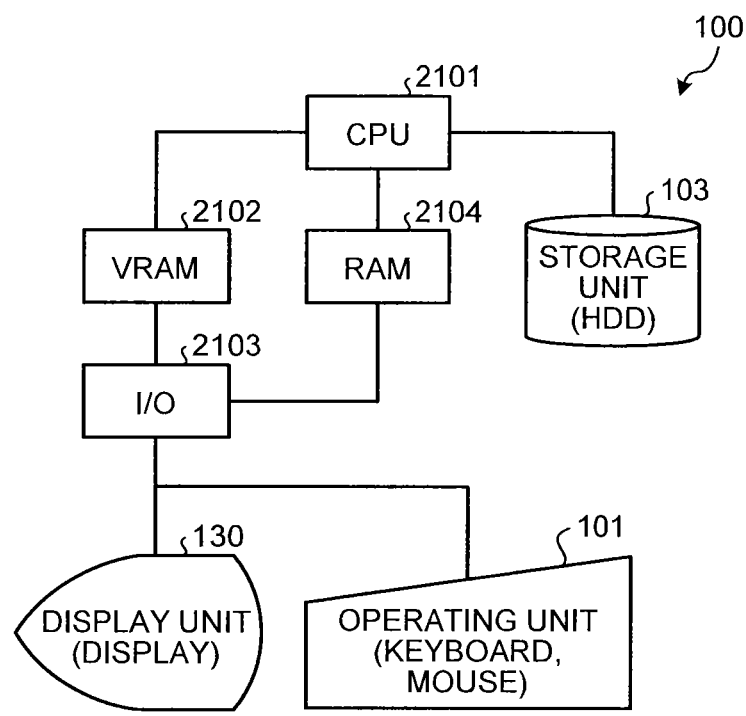
FIG. 34 is a diagram illustrating a hardware configuration of the display apparatus according to the embodiment.

FIG. 34 is a diagram illustrating a hardware configuration of the display apparatus 100 according to the embodiment. As illustrated in FIG. 34, the display apparatus 100 according to the embodiment includes a central processing unit (CPU) 2101, a memory such as a ROM (not illustrated), a RAM 2104, or a video RAM (VRAM) 2102, the storage unit 103 such as an HDD, the display unit 130 such as a display, the operating unit 101 such as a keyboard or a mouse, and an input output interface (I/O) 2103, and has a hardware configuration using a normal computer.

A display program executed by the display apparatus 100 according to the embodiment is provided by being recorded in a computer-readable recording medium, such as a compact disc (CD)-ROM, a flexible disk (FD), a compact disc-recordable (CD-R), or a digital versatile disk (DVD) in a computer-installable or a computer-executable file format.

Furthermore, the display program executed by the display apparatus 100 according to the embodiment may be stored in a computer connected to a network, such as the Internet, and may be provided by being downloaded via the network. Moreover, the display program executed by the display apparatus 100 according to the embodiment may be provided or distributed via a network, such as the Internet.

Furthermore, the display program executed by the display apparatus 100 according to the embodiment may be provided by being stored in a ROM or the like in advance.

The display program executed by the display apparatus 100 according to the embodiment has a module structure including the above units (the input unit 110, the specifying unit 102, the generating unit 120, and the display control unit 131). As actual hardware, the CPU 2101 reads the display program from the above recording medium and executes the program, so that the above units are loaded on a main storage device, and the input unit 110, the specifying unit 102, the generating unit 120, and the display control unit 131 are generated on the main storage device.

According to an embodiment of the present invention, it is possible to display a preview that accurately represents the reality of the sheet.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display apparatus that displays a preview of print data, the display apparatus comprising:
   an input unit configured to receive input of a sheet handling method of a sheet on which the print data is printed from a user, the sheet handling method being specified based on a sheet holding position and a sheet bending operation to be performed from the sheet holding position on the sheet on which the print data is printed;
   a specifying unit configured to specify a combination of sheet forms representing a behavior of the sheet on which the print data is printed based on inputs of the hold position and the sheet bending operation;
   a generating unit configured to sequentially generate sheet forms constituting the combination specified by the specifying unit, and dynamically generate a three-dimensional image representing the behavior being a continuous change in a bending form of the sheet on which the print data is printed;
   a display unit configured to display, as a moving image, the three-dimensional image of the sheet in bending form that is dynamically generated, and
   a correction unit configured to correct a distortion due to texture mapping;
   wherein the sheet operation includes a bending operation in which the user holds one side of the sheet, lifts the sheet up and then snaps the sheet downward with a snap of the wrist, and
   the input unit reads out data of the light reflection intensity parameter and grayscale data from a storage unit, generates texture information based on intensity of light from a light source to the sheet and intensity of light reflected from the sheet according to sheet types and with reference to the read-out data of the light reflection intensity parameter and grayscale data, and adds the texture information to the three-dimensional image;
   wherein the generating unit generates the three-dimensional image by dynamically generating a chronological Bezier surface representing the sheet forms for each of the sheet forms contained in the specified combination;
   wherein the correction unit corrects the distortion by calculating a movement amount of a plurality of control points of the Bezier surface until a length of the Bezier surface is within a predetermined acceptable range.

2. The display apparatus according to claim 1, further comprising:

the storage unit being configured to store therein a sheet type and a hardness parameter in an associated manner, wherein the input unit further receives input of the sheet type from the user, and the generating unit generates the three-dimensional image by using, as a maximum bending angle, a folding angle corresponding to the hardness parameter associated with the input sheet type.

3. The display apparatus according to claim 2, wherein the storage unit further stores therein magnitude of a force applied to the sheet and a correction value of the folding angle in an associated manner, wherein the input unit further receives input of the magnitude of the force applied to the sheet from the user, and the generating unit generates the three-dimensional image by using, as the maximum bending angle, a folding angle that corresponds to the hardness parameter associated with the input sheet type and that is corrected with a correction value associated with the input magnitude of the force applied to the sheet.

4. The display apparatus according to claim 1, wherein the specifying unit specifies, as the combination of the bending forms, a combination containing at least one of a returning form, a bending form, a bouncing form, and a downward-snap form.

5. The display apparatus according to claim 4, wherein the specifying unit specifies, as the combination of the bending forms, a combination of the returning form, the bouncing form, and the downward-snap form when the input operation indicates the operation to lift the sheet up and then snap the sheet downward.

6. The display apparatus according to claim 1, wherein the generating unit dynamically generates the three-dimensional image by calculating a maximum bending angle of the sheet, calculating a plurality of control points of the Bezier surface, and obtaining trajectories of the control points due to a change in the folding angle of the sheet within a range of the maximum bending angle, for each of the bending forms contained in the specified combination.

7. A display method implemented by a display apparatus that displays a preview of print data, the display method comprising:

receiving input of a sheet handling method of a sheet on which the print data is printed from a user, the sheet handling method being specified based on a sheet holding position and a sheet bending operation to be performed from the sheet holding position on the sheet on which the print data is printed;

specifying a combination of sheet forms representing a behavior of the sheet on which the print data is printed based on inputs of the hold position and the sheet bending operation;

sequentially generating sheet forms constituting the specified combination, and generating, in a dynamic manner, a three-dimensional image representing the behavior being a continuous change in a bending form of the sheet on which the print data is printed; and displaying, as a moving image, the three-dimensional image of the sheet in bending form that is dynamically generated, wherein the sheet operation includes a bending operation in which the user holds one side of the sheet, lifts the sheet up and then snaps the sheet downward with a snap of the wrist, reading out data of the light reflection intensity parameter and grayscale data, generating texture information based on intensity of light from a light source to the sheet and intensity of light reflected from the sheet according to sheet types and with reference to the read-out data of the light reflection intensity parameter and grayscale data, and adding the texture information to the three-dimensional image;

generating the three-dimensional image by dynamically generating a chronological Bezier surface representing the sheet forms for each of the sheet forms contained in the specified combination; and correcting a distortion due to texture mapping by calculating a movement amount of a plurality of control points of the Bezier surface until a length of the Bezier surface is within a predetermined acceptable range.

8. A computer program product comprising a non-transitory computer-usable medium having computer-readable program codes embodied in the medium, the program codes when executed causing a computer that displays a preview of print data to execute:

receiving input of a sheet handling method of a sheet on which the print data is printed from a user, the sheet handling method being specified based on a sheet holding position and sheet bending operation to be performed from the sheet holding position on the sheet on which the print data is printed;

specifying a combination of sheet forms representing a behavior of the sheet on which the print data is printed based on inputs of the hold position and the sheet bending operation;

sequentially generating sheet forms constituting the specified combination, and generating, in a dynamic manner, a three-dimensional image representing the behavior being a continuous change in a bending form of the sheet on which the print data is printed; and displaying, as a moving image, the three-dimensional image of the sheet in bending form that is dynamically generated, wherein the sheet operation includes a bending operation in which the user holds one side of the sheet, lifts the sheet up and then snaps the sheet downward with a snap of the wrist, reading out data of the light reflection intensity parameter and grayscale data, generating texture information based on intensity of light from a light source to the sheet and intensity of light reflected from the sheet according to sheet types and with reference to the read-out data of the light reflection intensity parameter and grayscale data, and adding the texture information to the three-dimensional image;

generating the three-dimensional image by dynamically generating a chronological Bezier surface representing the sheet forms for each of the sheet forms contained in the specified combination; and correcting a distortion due to texture mapping by calculating a movement amount of a plurality of control points of the Bezier surface until a length of the Bezier surface is within a predetermined acceptable range.

* * * * *